United States Patent [19]
Shrader et al.

[11] Patent Number: 5,867,713
[45] Date of Patent: Feb. 2, 1999

[54] COMMITTING AN INSTALL PLAN OBJECT FOR THE NETWORK INSTALLATION OF APPLICATION PROGRAMS

[75] Inventors: Theodore Jack London Shrader, Cedar Park; John Lawrence Bunce; Barbara Jean Jensen, both of Austin, all of Tex.

[73] Assignee: International Business Machines Corporation, Armonk, N.Y.

[21] Appl. No.: 417,162

[22] Filed: Apr. 5, 1995

[51] Int. Cl.⁶ .................................................... G06F 9/44
[52] U.S. Cl. ........................................ 395/712; 375/200.5
[58] Field of Search ................................. 395/712, 704, 395/200.1, 651, 652, 653, 200.5, 200.52, 200.51

[56] References Cited

U.S. PATENT DOCUMENTS

| | | |
|---|---|---|
| 4,227,245 | 10/1980 | Edblad et al. . |
| 4,558,413 | 12/1985 | Schmidt et al. . |
| 5,155,837 | 10/1992 | Liu et al. . |
| 5,155,847 | 10/1992 | Kirouac et al. . |
| 5,257,376 | 10/1993 | Beck et al. . |
| 5,293,476 | 3/1994 | Wolber et al. . |
| 5,295,244 | 3/1994 | Dev et al. . |
| 5,315,703 | 5/1994 | Matheny et al. . |
| 5,339,430 | 8/1994 | Lundin et al. . |
| 5,339,435 | 8/1994 | Lubkin et al. . |
| 5,349,674 | 9/1994 | Calvert et al. . |
| 5,359,721 | 10/1994 | Kempf et al. . |
| 5,359,730 | 10/1994 | Marron . |
| 5,361,355 | 11/1994 | Kondo et al. ............................ 395/704 |
| 5,361,360 | 11/1994 | Ishigami et al. . |
| 5,367,633 | 11/1994 | Matheny et al. . |
| 5,369,570 | 11/1994 | Parad . |
| 5,371,884 | 12/1994 | Ross . |
| 5,379,429 | 1/1995 | Hirasawa et al. . |
| 5,379,430 | 1/1995 | Nguyen . |
| 5,394,522 | 2/1995 | Sanchez-Frank et al. . |
| 5,421,009 | 5/1995 | Platt ......................................... 395/712 |
| 5,487,141 | 1/1996 | Cain et al. ............................... 395/135 |
| 5,493,682 | 2/1996 | Tyra et al. ............................... 395/712 |
| 5,499,357 | 3/1996 | Sonty et al. ............................. 395/500 |
| 5,546,526 | 8/1996 | Li et al. ................................... 395/159 |

OTHER PUBLICATIONS

Technical Disclosure Bulletin, vol. 36 No. 10 Oct. 1993. Design for Cataloging Database at a Server Workstation, p. 319.

Technical Disclosure Bulletin, vol. 37 No. 02B Feb. 1994. Technique for Implementing Connected Topologies Within an IBM LAN Netview Start Network, pp. 545–546.

Technical Disclosure Bulletin, vol. 37 No. 04A Apr. 1994. Automatic Creation of an Attribute Value File for IBM LAN Netview Start Databases.

Technical Disclosure Bulletin, vol. 37 No. 04B Apr. 1994. Transformer Rules Strategy for Software Distribution Mechanism–Support Products, pp. 523–525.

*Primary Examiner*—Kevin A. Kriess
*Attorney, Agent, or Firm*—Jeffrey S. LaBaw

[57] ABSTRACT

Committing an installation plan object for installing applications in a network. The installation plan object includes an application-in-plan object which represents an application program and a group-in-plan object which represents a group of workstations on which the application program is to be installed. As part of the commit process, the installation plan object is prevalidated by examining its child objects and adding additional child objects to the installation plan object if required, validated by examining data in the installation plan object and its child objects for errors in the data and transformed into data structures usable for a network installation engine which installs applications across a network. The installation plan further includes a response file object if the application's installation requires a response file and a customization file object which contains data to customize the response file object data for particular workstations.

25 Claims, 27 Drawing Sheets

| | |
|---|---|
| PLAN | 200 |
| APPIP 1 | 202 |
| CUSTFILE 1 | 204 |
| CATIP 1 | 206 |
| RSPFILE 1 | 208 |
| APPIP 2 | 210 |
| ⋮ | 212 |
| APPIP N | 214 |
| CATIP N | 216 |
| RSPFILE N | 218 |
| GROUPIP | 220 |
| WKSIP 1 | 222 |
| WKSAPPIP 1 | 224 |
| CATIP 1 | 226 |
| RSPFILE 1 | 228 |
| WKSAPPIP 2 | 230 |
| ⋮ | 232 |
| WKSAPPIP N | 234 |
| CATIP N | 236 |
| RSPFILE N | 238 |
| WKSIP 2 | 240 |
| ⋮ | 242 |
| WKSIP M | 244 |

FIG. 2

| | |
|---|---|
| POF File | 2000 |
| Plan Section | 2002 |
|   Sequence | 2004 |
|   App Section 1 | 2006 |
|   • • | 2008 |
|   App Section N | 2010 |
|   Workstation Section 1 | 2012 |
|   • • • | 2014 |
|   Workstation Section N | 2016 |
|   Server Section 1 | 2018 |
|   • • • | 2020 |
|   Server Section N | 2022 |

FIG. 17A

| | |
|---|---|
| Plan Status File | 2030 |
| Plan Section | 2032 |
|   Workstation Section 1 | 2034 |
|     Workstation Log 1 | 2036 |
|     • • • | 2038 |
|     Workstation Log N | 2040 |
|     Workstation Status File | 2042 |
|   • • • | 2044 |
|   Workstation Section N | 2046 |

FIG. 17B

| | |
|---|---|
| Workstation Queue File | 2060 |
| Plan Name 1 | 2062 |
| ... | 2064 |
| Plan Name N | 2066 |

FIG. 18A

| | |
|---|---|
| PRE Command File | 2070 |
| Attach Installation 1 | 2072 |
| ... | 2074 |
| Attach Installation N | 2076 |
| Network Installation Enablement | 2078 |

FIG. 18B

| | |
|---|---|
| POST Command File | 2080 |
| Remove Attach 1 | 2082 |
| ... | 2084 |
| Remove Attach N | 2086 |
| Remove Network Installation Enable | 2088 |

FIG. 18C

| | |
|---|---|
| LCU Command File | 2090 |
| Setup Section | 2092 |
| Attach Section | 2094 |
| Variables Section | 2096 |
| Product Data Section | 2098 |
| Install Section | 2100 |
| Checkit Procedure | 2102 |
| Base LCU Procedure Section | 2104 |

FIG. 18D

COMMITTING AN INSTALL PLAN OBJECT FOR THE NETWORK INSTALLATION OF APPLICATION PROGRAMS

CROSS REFERENCE TO RELATED APPLICATION

This application is related to co-pending application entitled "Install Plan Object For The Network Installation of Application Programs," Ser. No. 08/416,666, filed on the same date as this application, and is hereby incorporated by reference. This application and the co-pending application are assigned to the same assignee.

BACKGROUND OF THE INVENTION

This invention relates generally to electronic distribution of software in computer networks. More particularly, the invention relates to an architecture for validating the proposed plan for installing the software before the plan is executed by the network administrator on the network.

It is common to couple a plurality of data processing systems interconnecting computing networks such as a Local Area Network (LAN) or a Wide Area Network (WAN). Each of the computer systems will have a plurality of software programs resident. In the infancy of such networks, a network administrator sat at each workstation with a set of diskettes and manually entered the parameters for each software product which needed to be installed, configured or maintained. With only a few workstations, administrators and users could afford to manually feed disks into their workstations and answer prompted questions during the installation or configuration process. As the size of the network increased, it naturally became more difficult to install software in such a manner. As the size and complexity of the network and the number of interdependencies between computer software products increased, configuring each workstation became an increasingly complex, time consuming, error prone process. Administrators could no longer afford this manual route and instead turned to products specifically designed to install and configure applications on workstations over the network.

It has therefore become increasingly accepted to install computer software and configure workstations remotely. One accepted term for this process is electronic software distribution (ESD). The electronic distribution of software within a network has been known in the art for almost a decade. Some of the more popular ESD products include: NetView Distribution Manager and the LAN Configuration Installation Distribution utility, both from the IBM Corporation and the Network Navigator from Novell. These products are designed to alleviate the onerous tasks of software distribution, installation and configuration over the network.

Although ESD products have been in existence for a number of years, these products do not completely address all problems faced by the network administrator. One of the largely unaddressed problems faced by the network administrator is the planning and execution of the distribution, installation and configuration of plurality of software programs on a group of workstations in the network. Because of the growing number of interdependencies between software products and the complexity of the networks, this is a daunting task.

There have been prior efforts to alleviate the burden on the network administrator. Previous efforts concentrated more on the "plumbing" of network installation, such as how to transport the images across the network or the physical building of the files needed in the installation and configuration process. These designs helped the administrator in the physical tasks, e.g., transporting an application throughout the network, but did not help the administrator plan what the physical tasks should be.

The present invention decomposes the network installation and configuration planning process into a series of discrete objects that help to abstract the problem and provide an easy, object-oriented, and graphical means by which administrators can set-up and view the applications that are slated to be installed and configured on a set of workstations on the LAN. The administrator can use this object-oriented representation to create the files needed for the physical installation and configuration process. The present invention provides administrators with a higher level view of the problem, shielding them from most of the physical implementation and leaving them to concentrate on the building blocks for the plan. Administrators can use this design to create objects in the "playground" or non-plan area which can be validated in a plan object and committed to create the actual files needed in the physical installation and configuration process.

The present invention represents an important improvement in electronic software distribution.

SUMMARY OF THE INVENTION

Therefore, it is an object of the invention to validate an installation plan object.

It is another object of the invention validate prerequisite files such as server directories.

It is another object of the invention to add prerequisite objects or attributes to the installation plan which were originally missing from the plan.

It is another object of the invention to commit an install plan to create the necessary files to install and configure applications on workstations on a LAN.

It is another object of the invention to couple with network installation tools which are procedurally based rather than object oriented.

These and other objects are accomplished by committing an installation plan object for installing applications in a network. The installation plan object includes an application-in-plan object which represents an application program and a group-in-plan object which represents a group of workstations on which the application program is to be installed. As part of the commit process, the installation plan object is prevalidated by examining its child objects and adding additional child objects to the installation plan object if required, validated by examining data in the installation plan object and its child objects for errors in the data and transformed into data structures usable for a network installation engine which installs applications across a network. The installation plan further includes a response file object if the application's installation requires a response file and a customization file object which contains data to customize the response file object data for particular workstations.

The validation step checks file directories on a target workstation which are specified as data in the installation plan object to determine if the file directories and file objects are physically valid and accessible on the network. The validation step also confirms existence of objects on a code server workstation which are necessary for the installation of the application on the group of workstations. In the preferred embodiment, the code server objects are not child objects of the installation plan object. It also determines whether an application object represents an application which provides an update to a first application in the network; if so, it confirms the existence of a first application object which represents the first application in an applications container object. The validation step may also confirm the operating system and its level of corrective service on a target workstation.

One important feature of the invention is that the installation plan object will usually contains a plurality of application-in-plan objects and a plurality of corresponding response file objects. This is true since a plurality of applications are to be installed each on workstations in the plan, requiring a corresponding response file. The customization file object can be applied to the plurality of response file objects to customize the plurality of response file objects to particular workstations in the group of workstations.

The invention also encompasses repeating the prevalidating, validating and transforming steps for a plurality of installation plan objects. The plurality of installation plan objects can be queued for each workstation.

BRIEF DESCRIPTION OF THE DRAWINGS

These objects, features and advantages will be more readily understood with reference to the attached figures and following description.

FIG. 2 shows a hierarchical representation of an install plan object.

FIGS. 17A and 17B show a plan output file and a plan status file.

FIGS. 18A–18D depict a workstation queue file, a PRE command file, a POST command file and an LCU command file respectively.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2* Model 50, 60 Systems IBM Corporation, Part No. 68X2224 Order Number S68X-2224 and *Technical Reference 2 Manual Personal Systems/2* (Model 80) IBM Corporation Part No. 68X 2256 Order Number S68X-2254. One operating system which an IBM PS/2 personal computer may run is IBM's OS/2 2.0 (TM) for more information on the IBM OS/2 2.0 Operating System the reader is referred to OS/2 2.0 *Technical Library, Programming Guide* Vol. 1. 2. 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, RISC System/6000, 7073 and 7016 *POWERstation and POWERserver Hardware Technical* reference, Order No. SA23-2644-00. The AIX operating system is described in *General Concepts and Procedure—AIX Version 3 for RISC System/*6000 Order No. SC23-2202-00as well as other publications of the IBM Corporation.

Figure 1:
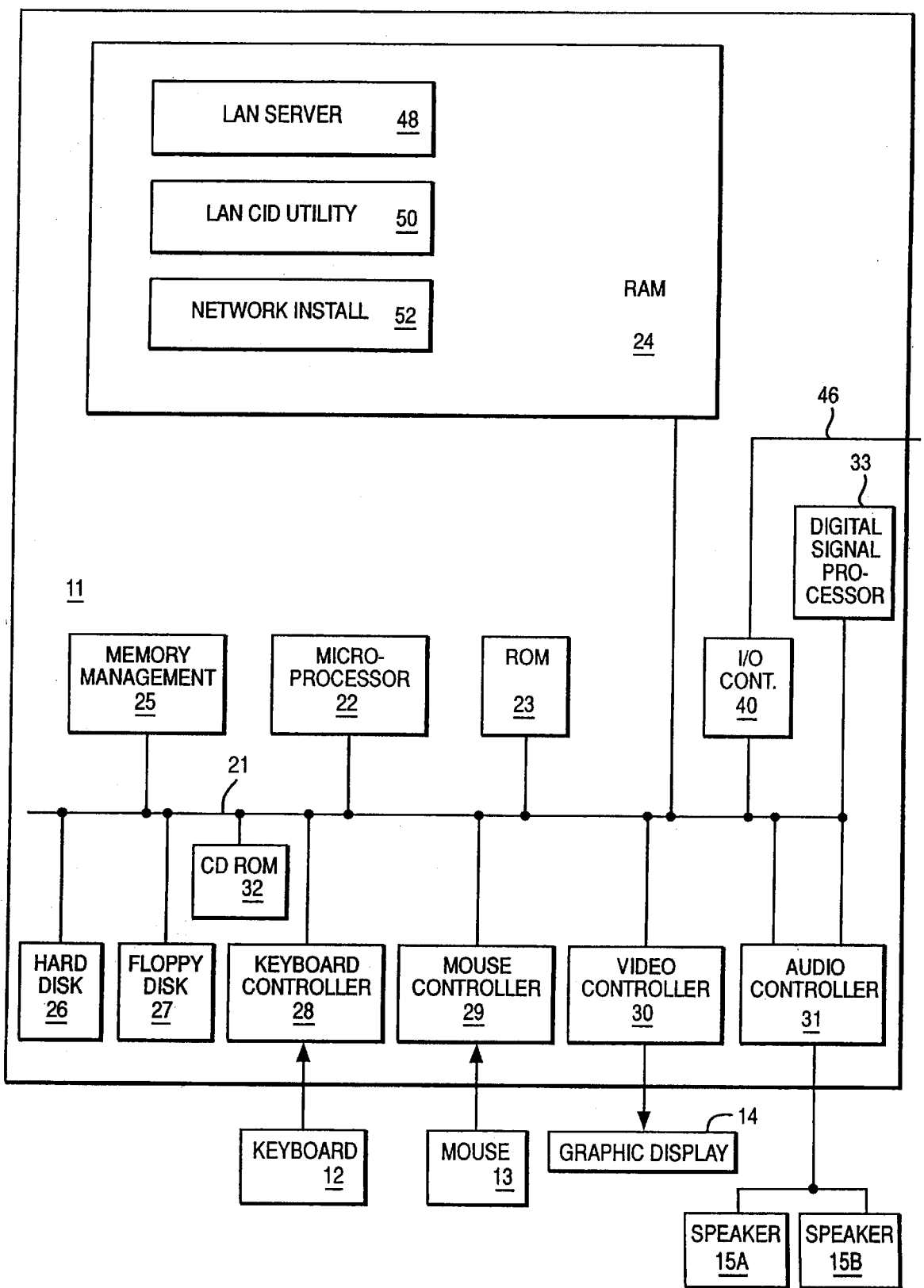
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

The network in which the workstation is integrated is a Local Area Network (LAN) or a Wide Area Network (WAN), the latter comprising a teleprocessing connection to other nodes or a network of systems operating under a known computer architecture. At any of the nodes, there may be one or more processing systems each of which may be a single user or a multi-user system configured more or less as described above. These processing systems operate as a client or server workstation depending upon whether it is requesting or supplying services. In one particular implementation, the invention runs on a plurality of IBM compatible workstations interconnected by the IBM OS/2 LAN Server architecture including LAN Server 48, the LAN CID utility 50 and the Network Installation Application 52 in which the present invention is implemented. These applications may be packaged together or sold as separate applications. A simplified description of local area networks may be found in a book by Larry E. Jordan and Bruce Churchill entitled: *Communications and Networking For The IBM PC* Published by: Robert J. Brady (A Prentice Hall Company 1983). The simplest configuration for the administrator would be to have one code server on the LAN and have the network installation program running on that workstation. This design does not preclude the administrator from having more than one code server defined on the LAN.

One of the methods of Configuration, Installation and Distribution (CID) which have been defined by the IBM Corporation is based on the use of response files end combination with a product's own installation program. In the CID process, a network administrator selects one or more machines in the network as a code server from which other workstations in the network receive the computer software images, including the response files. A response file is a flat ASCII file that contains a set of responses to a corresponding set of questions asked by the program during the installation and/or configuration process. More information on the CID process of a general nature can be found in LAN Configuration Installation and Distribution Utility Guide, Order No. S10H-9742-00 a publication of the IBM Corporation. The program module which automates the redirected installation configuration, is called the LAN Configuration Installation Distribution Utility (LCU). Many of the details in the description of the embodiment below are due to using LCU as the engine to accomplish the actual physical tasks of installing the applications across the network. In the preferred embodiment below, the files generated by the commit process of the present invention are the command files and response files required by LCU. This demonstrates that the object based design of the present invention can be used to create files useful to a procedural installation engine, e.g., LCU. If a different installation engine were used, the commit process would generate different files or objects if the installation engine were object oriented. An LCU command file identifies the products which the network administrator plans to install on a workstation as well as the order in which the products should be installed or configured. Administrators can have separate LCU command files for each workstation on a network. A response file contains information needed for installing a software product on the workstation. Administrators can have one response file per application, but one response file can include additional embedded response files if support by the application's install or configure program. Response files may be shared between workstations if there is no workstation specific information. They are to be reinstalled or configured with the same rules, but response files cannot be shared between application. Other files generated include a Configuration file which is used to configure the code server and a authorization list file which is used to give clients access to the code server. Application Images are stored on the code server from which the applications are installed. The LAN CID Utility procedures which track the current state of installation ensure that each step is running in the proper sequence. One skilled in the art would understand that this environment is only one of many possible in which the present invention could be implemented.

An important aspect of the invention is that the install plan object and its subcomponents are implemented in an object oriented system. Of course, as shown by the embodiment described herein the object oriented plan object can be grafted onto a procedural based installation engine such as the LAN CID utility. While objects and object oriented programming are known, a few facets are worth mentioning at this time. Each object has certain data attributes and methods which operate on the data. Data is said to be "encapsulated" by an object and can only be modified by the method which belongs to the object. Methods are typically invoked by sending a message to an object, identifying the desired method and supplying any needed arguments. Class Objects can be subclassed to create new class objects. "Inheritance" is the ability to derive a new object from an existing object inheriting all properties such as methods and data structure from the existing object. The new object may have certain unique features such as new methods which are added to or override existing methods of the existing class. A new subclass needs only specify the methods and data which distinguish it from its already existing base class. Thus, the software developer does not need to develop an entirely new piece of code. He or she need only specify the new unique features of the software. For background information on object oriented technologies, concepts and conventions, the reader is referred to publications such as *Object Oriented Design With Applications*, by Grady Booch (The Benjamin/Cummins Publishing Company, 1990) and *Object Oriented Software Construction*, by B. Meyer, (Prentice Hall, 1988). For the present invention, the object oriented nature of the install plan and its components allows the reuse of the base application and workstation objects by creating instances of those objects for multiple plan objects or group objects.

The hierarchical representation of the Install Plan (plan) object and the objects that it contains is shown in FIG. 2. Objects can exist outside the plan object in the "playground" or be brought inside the plan object creating an "in plan" instance of the object. The plan object 200 sits atop the hierarchy and the administrator can work with more than one plan object at a time. According to a preferred embodiment, a valid plan object will contain one or more Application-in-plan (AppIP) objects 202, 210, and 214. An AppIP object represents an application program to be installed or configured on a group of workstations. A valid plan object will also contain a Group-in-plan (GroupIP) object 220. A group-in-plan object is similar to a group object except that it only holds workstation-in-plan objects and not workstation objects. A group-in-plan could represent a single set of workstations or the entire network so long as all the workstation-in-plan objects are unique. Uniqueness is keyed off of the workstations' identifying names. The invention can easily be extended to support more than one group-in-plan object in an install plan.

Each AppIP object can contain zero or one Customization file (CustFile) 204 and zero or one Category-in-plan (CatIP) object 206, 216, 226, and 236. Each application-in-plan object preferably has a single action which it will perform such as installation, thus, it has only have one category-in-plan object which matches the action of the application-in-plan. If an application-in-plan object does not need a response file to perform an action, it does not need a category-in-plan either. A CustFile object may be configured a matrix file with keywords on the vertical axis and workstation names on the horizontal axis. One skilled in the art would appreciate that other configurations are possible. For example, the CustFile object may contain all of the methods needed to modify a response file together with the instance date stored in tabular form. At commit time, the CustFile object is applied to one or more application-in-plan response files to customize them for a particular set of workstations. A CatIP object represents the selected action for the AppIP object, such as install or configure, that can be performed on the workstation-in-plan object. Each CatIP object will contain zero or one Response files (RspFile) 208, 218, 228, and 238. RspFiles are ASCII keyword-equal-value files that are used by the application-in-plan installation or configuration program in place of operator input to questions or panels when the application is installed or configured. One skilled in the art would understand that the embodiment could be extended to also store CustFile objects under a GroupIP object.

A GroupIP object will contain one or more Workstation-in-plan (WksIP) objects 222, 240, and 244. Each WksIP object will contain one or more Workstation-application-in-plan (WksAppIP) objects 224, 230, and 234. The number of WksAppIP objects for each WksIP object is directly related to the number of AppIP objects. Each WksAppIP object under a workstation has a link to an AppIP object for propagation of response files and other information. As mentioned earlier, WksAppIP objects can also contain zero or one CatIP objects, as with the AppIP object.

The network installation program which creates the install plan object can be shipped with a set of fully-defined applications, or operating systems such as OS/2 Warp™. In such a configuration, all the attributes and commands the application needs to perform installations and configurations are included. If administrators need to install and configure additional applications or modify the installation and configuration of existing applications, they can start by first creating the workstation group and the workstation objects that represent the groups of workstations and single workstations in their network, creating a plan object, and dragging the workstation groups and applications into the newly created plan. If the response files do not need to be modified, either manually or by using customization files, the administrator can immediately commit the plan to create the files needed for the physical installation and configuration process. The use of the application objects and the workstation objects for different plans is one particularly important facet of the invention. They do not need to be created again to be used in other plans.

Figure 3A:
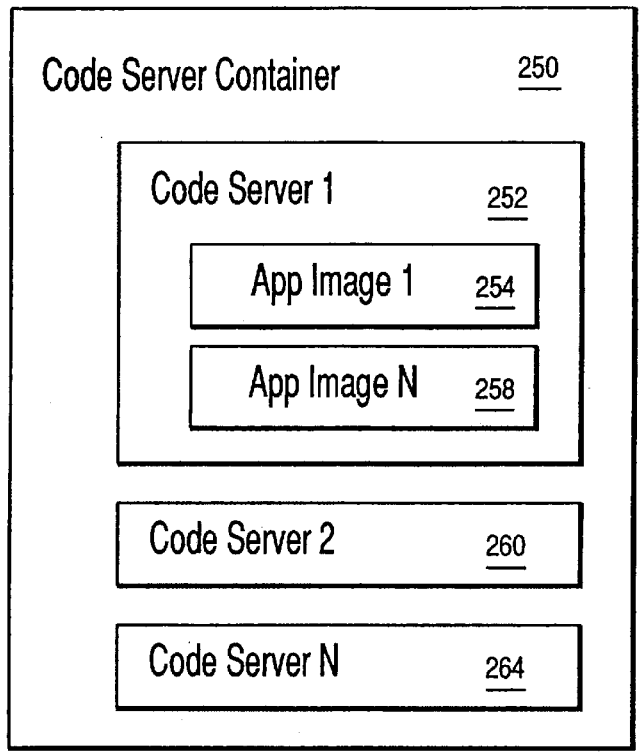
FIGS. 3A–3B show objects which are related to objects in an install plan object.
Figure 3B:
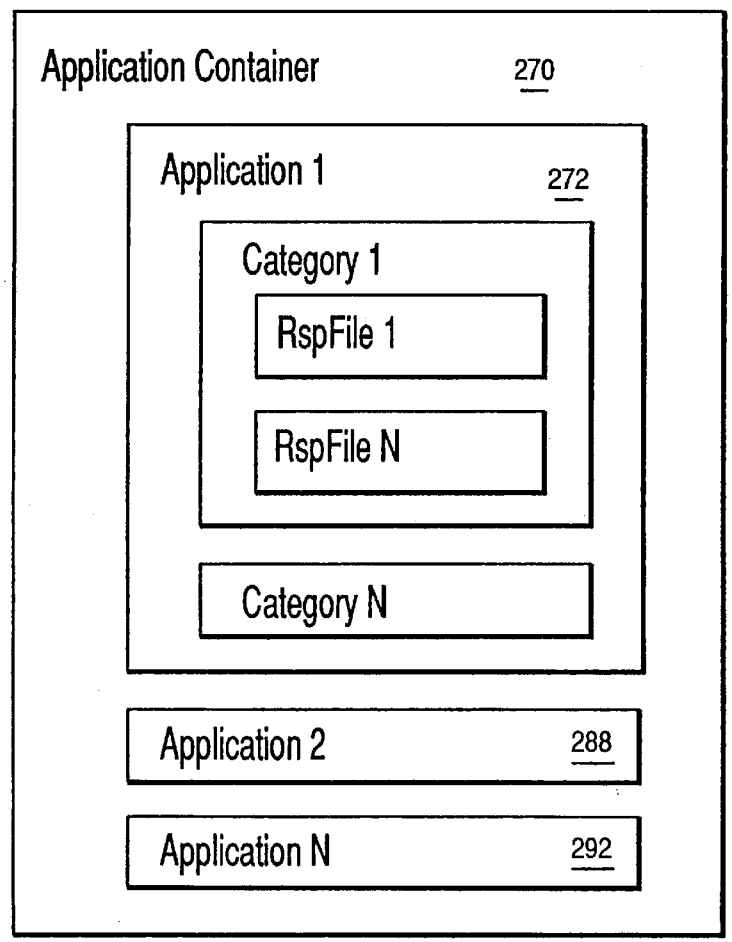

FIGS. 3A and 3B show objects that are related to objects in an install plan, but that do not exist within an install plan. The Code Server container object 250 in FIG. 3A contains one or more code server objects 252, 260, and 264. Among other information, code servers store the images of applications to be installed or configured on workstations. Each code server object 252 will have one or more Application Image (AppImage) objects, 254 and 258, representing these product images. An AppImage object has a link to an Application object in the Application Container object. A link is an attribute of an object that points to another object in the network installation program.

FIG. 3B shows the Application Container object 270 which holds one or more Application (App) objects 272, 288, and 292. Each App object can contain one or more Category (Cat) objects. Each Cat object corresponds to an action that can be performed by the App object, such as install or configure. Each Cat object can have one or more RspFile objects. When an App object is added to a plan, it is transformed into an AppIP object and only the Cat object corresponding to the action type selected by the administrator is transformed into a CatIP object along with the RspFile marked as the default, if any. Default response files would be ones that the administrator uses to set installation or configuration values in most circumstances. More details on the objects which are found in the network installation program and the installation plan object are found in the above referenced and incorporated application.

Figure 3C:
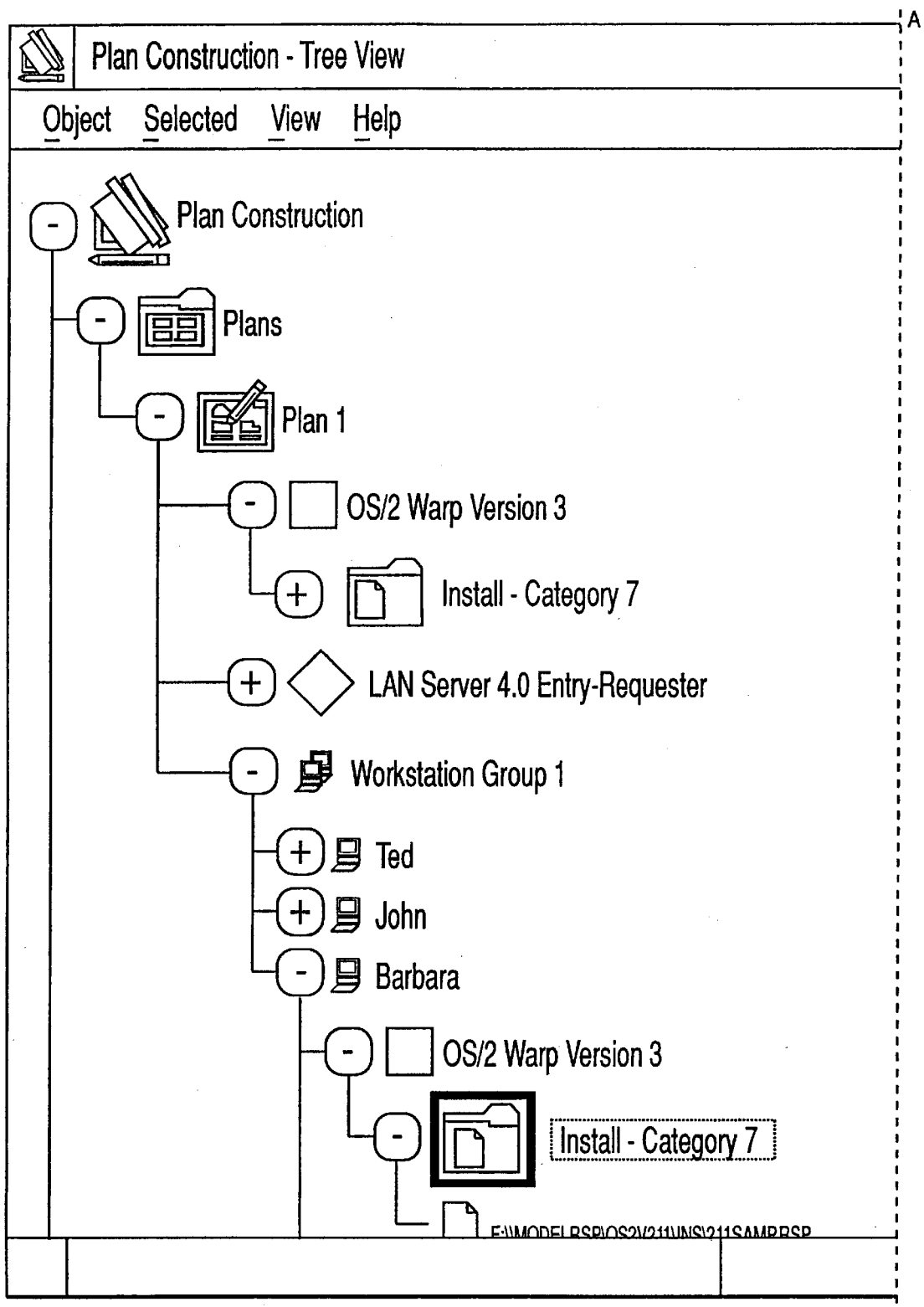
FIG. 3C shows a graphical interface for presenting the network installation program.
Figure 3D:
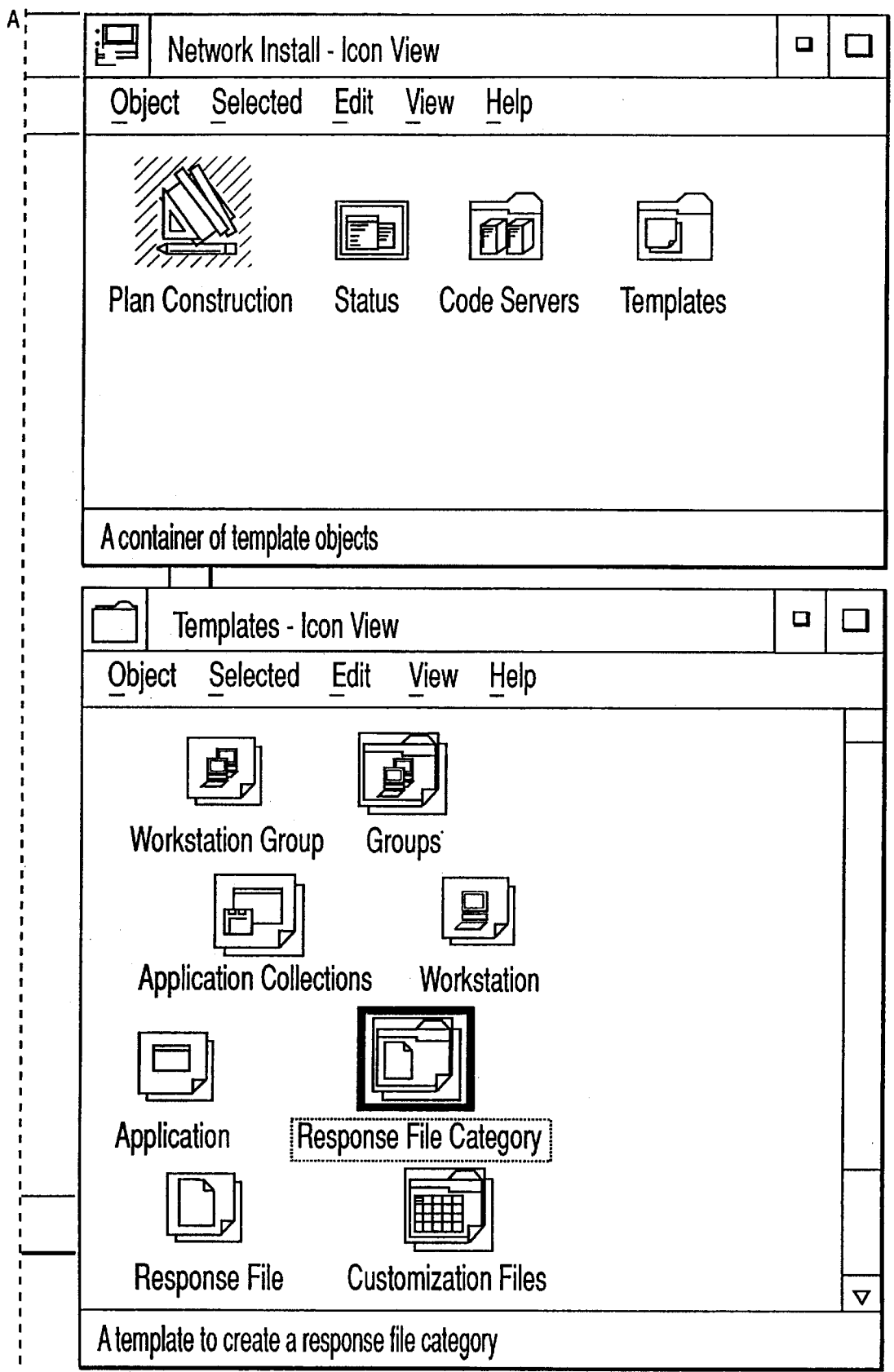

In a graphical user interface, the App and AppIP objects are represented in the same visual manner to the administrator, such as through an icon in a tree view window. For implementation, different objects exist in the plan and non-plan objects. Two different, but related, object classes could be used to represent plan and non-plan objects or one class could be used along with an attribute flag or method the instance of the class could call to determine if it was part of a plan object. FIG. 3C shows a possible graphical interface for presenting the network installation program. On the left side of the figure is a tree view of objects showing a folder of plan objects. This folder was opened to show most of the contents of a plan object named "Plan Version 1", which also contains an APPIP object, titled "OS/2 Warp Version 3", and a CatIP object, titled "Install-Category 7". The plan object also contains another AppIP object, titled "LAN Server 4.0 Entry-Requester", and a GroupIP object, titled, "Workstation Group 1". The GroupIP object was expanded to show the WksIP objects, titled, "Ted", "John", and "Barbara". The "Barbara" WksIP object was expanded to show the WksAppIP object, titled "OS/2 Warp Version 3", which corresponds to the AppIP object of the same title. The WksAppIP object was opened to show a CatIP object, titled "Install-Category 7", and it contains a response file with a file name title of "F:\nwi\MODELRSP\OS2W3O\INS\WARPSAMP.RSP" The other WksAppIP object, "LAN Server 4.0 Entry-Requester" is not shown, but it would also be part of the "Barbara" workstation.

The top right side of the figure shows the top level container for the network installation program, which displays the "Plan Construction", "Status", "Code Servers", and "Templates" objects. The "Plan Construction" object opens to the window on the left side of the figure. The "Status" object opens to a dialog which allows the administrator to view the status of application installation and configuration on a per workstation or per plan basis. The "Code Servers" object opens to display the code server objects defined in the network installation program. The "Templates" objects opens to provide template objects from which the administrator can create regular objects, such as a plan or application object. The opened "Templates" object is show in the bottom right side of the figure.

The graphical representation in FIG. 3C is not the only way in which the objects in a network installation program can be depicted to the administrator. WKsAppIP objects and its child objects could be displayed and selectable in the settings notebook of the WksIP, for example. Although both objects are not shown, similar objects, such as App and AppIP objects, will have the same icon representation unless the administrator physically changes the associated icon. One skilled in the art could design many alternative graphical user interfaces for the network installation program.

Figure 4:
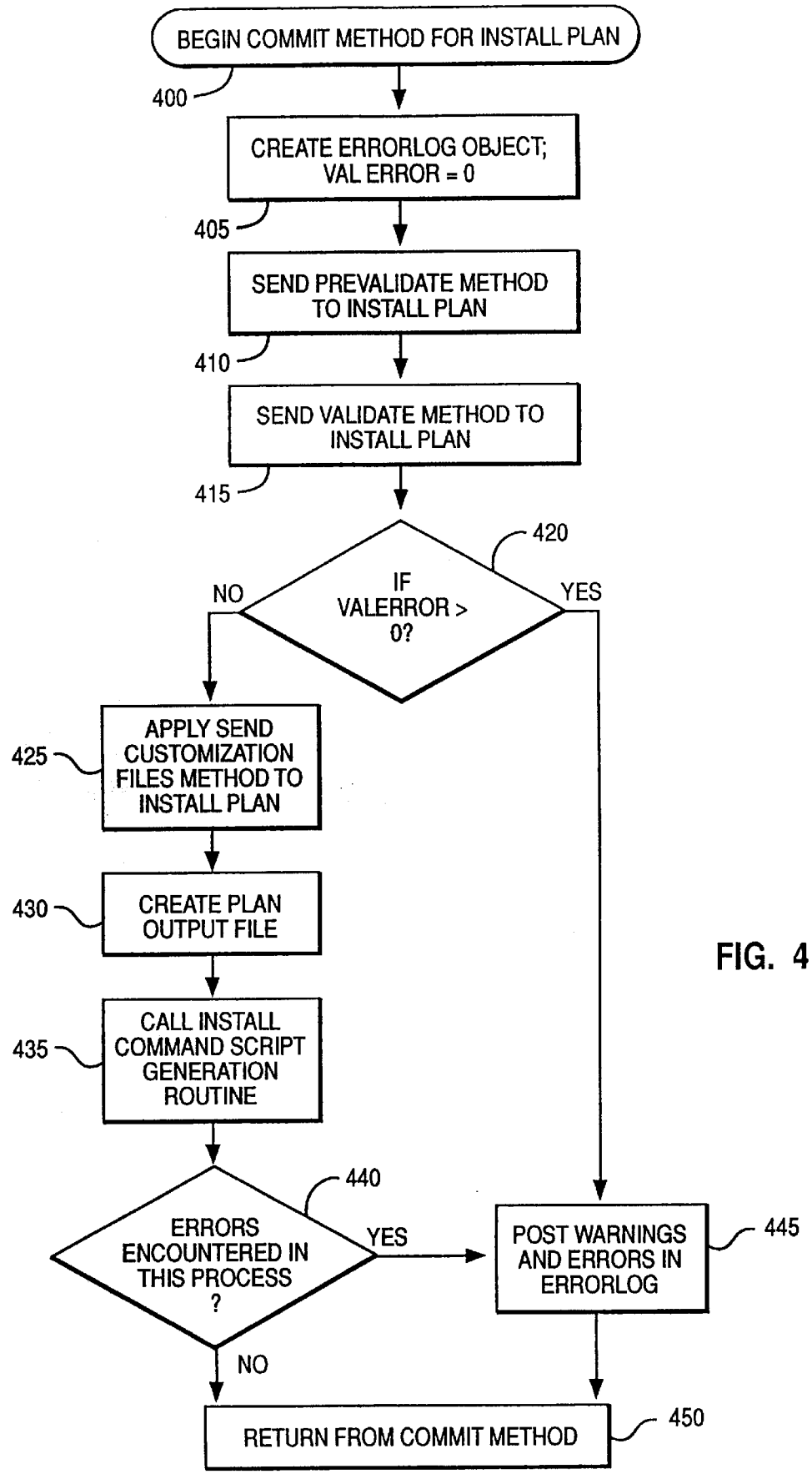
FIG. 4 is a flow diagram of the commit process.

The commit process to transform the objects in an install plan to files that can be used by the physical installation and configuration process for an install plan begins with the administrator initiating this event through an action, such as selecting a Commit menu item from the install plan menu. This action causes the COMMIT method to be sent to the install plan object in method entry block 400 in FIG. 4. The commit process continues in step 405 where the install plan object creates the error log object ERRORLOG to store status, warning, and error messages encountered during the commit process. The VALERROR counter is also set to keep track of severe errors encountered during the validation process.

Next, the PREVALIDATE method is sent to the install plan object in step 410. The PREVALIDATE method adds objects or attributes to a plan object if they are needed for a successful install or configuration and is shown in greater detail in FIG. 5. After PREVALIDATE returns, the VALIDATE method which checks for correct data in the plan is sent to the install plan object in 415. The VALIDATE method is depicted in FIG. 6. The VALERROR counter is checked in decision block 420. If the VALERROR counter is greater than zero, processing continues with step 445 where the ERRORLOG object posts the warnings and errors it encountered during the commit process. After posting the log, the COMMIT method ends in return block 450.

Figure 7:
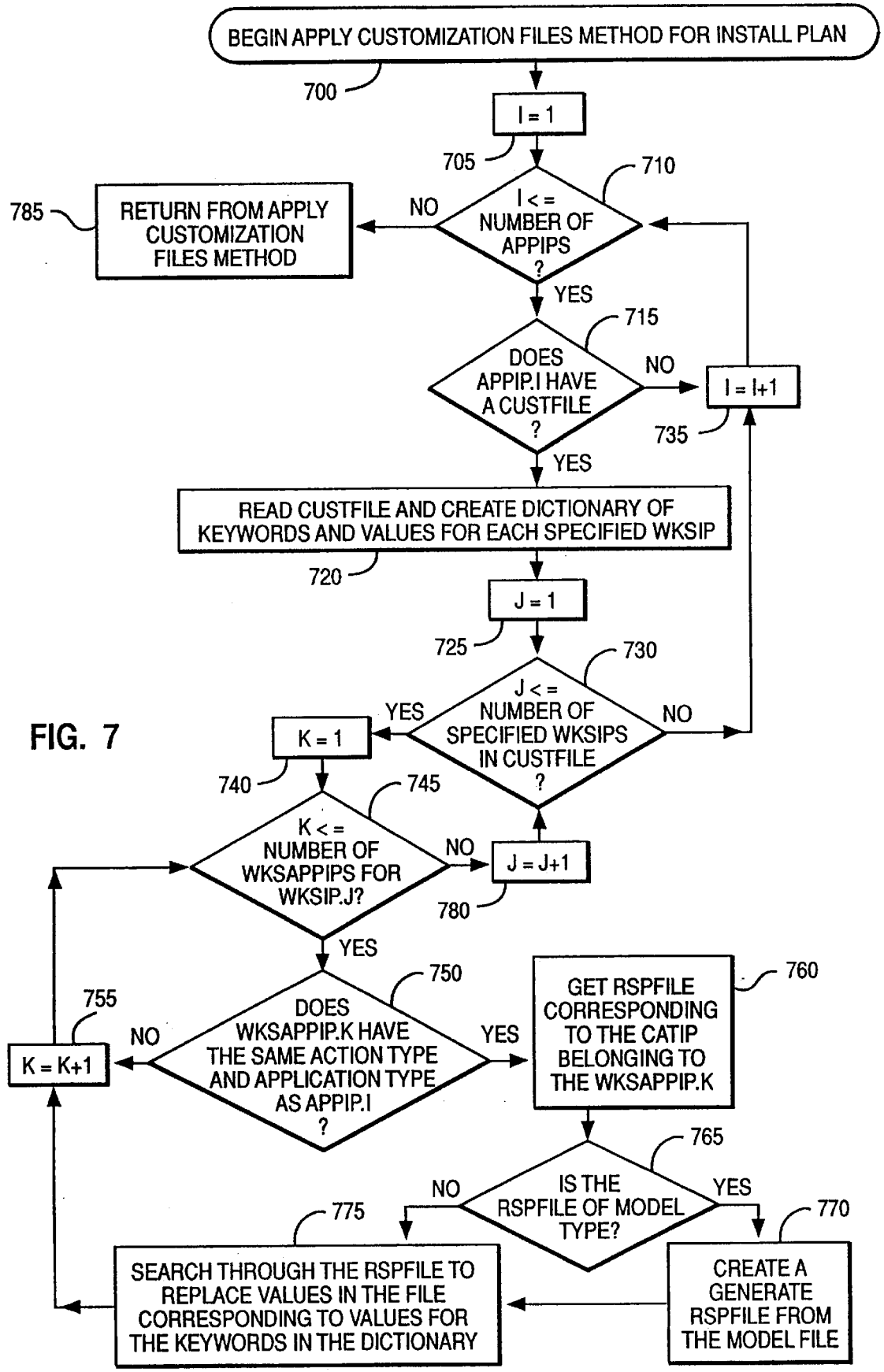
FIG. 7 depicts the process of applying a customization file object to a response file in the install plan object.

If the VALERROR counter is zero, commit processing continues to step 425 where the APPLY CUSTOMIZATION FILES method shown in FIG. 7 is sent to the install plan object. After the return from the APPLY CUSTOMIZATION FILES method, the install plan object creates the Plan Output File in step 430. The Plan Output File acts as a data intermediary to the INSTALL COMMAND SCRIPT GENERATION routine shown in greater detail in FIG. 19, which is called in step 435. After the INSTALL COMMAND SCRIPT GENERATION routine returns, the install plan checks to see if any errors were encountered in the remaining part of the commit process in decision block 440. If errors were encountered, processing continues to step 445. If no errors were encountered, the COMMIT method ends in return block 450.

Figure 5:
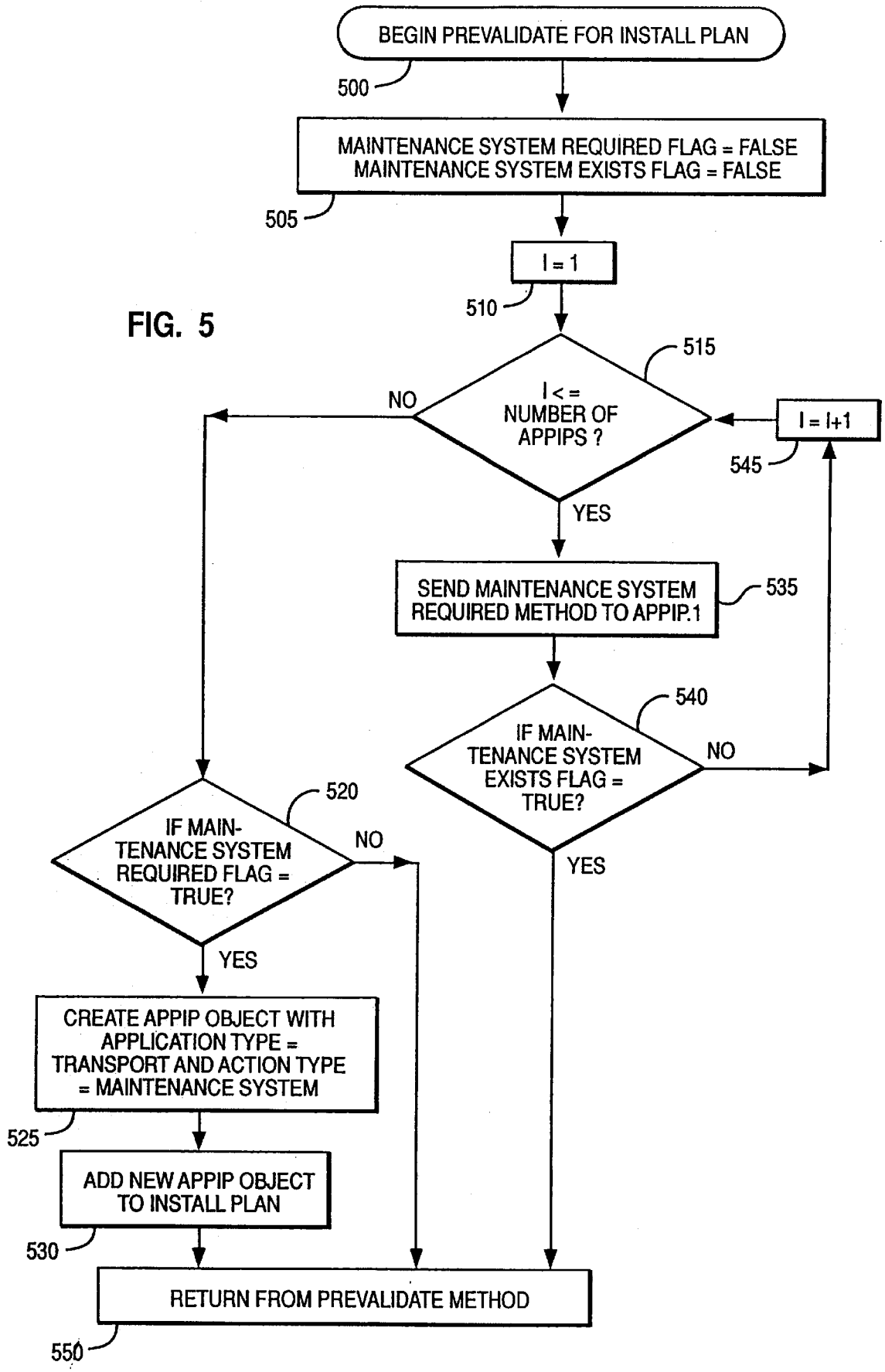
FIG. 5 is a flow diagram of the prevalidation process.
Figure 6:
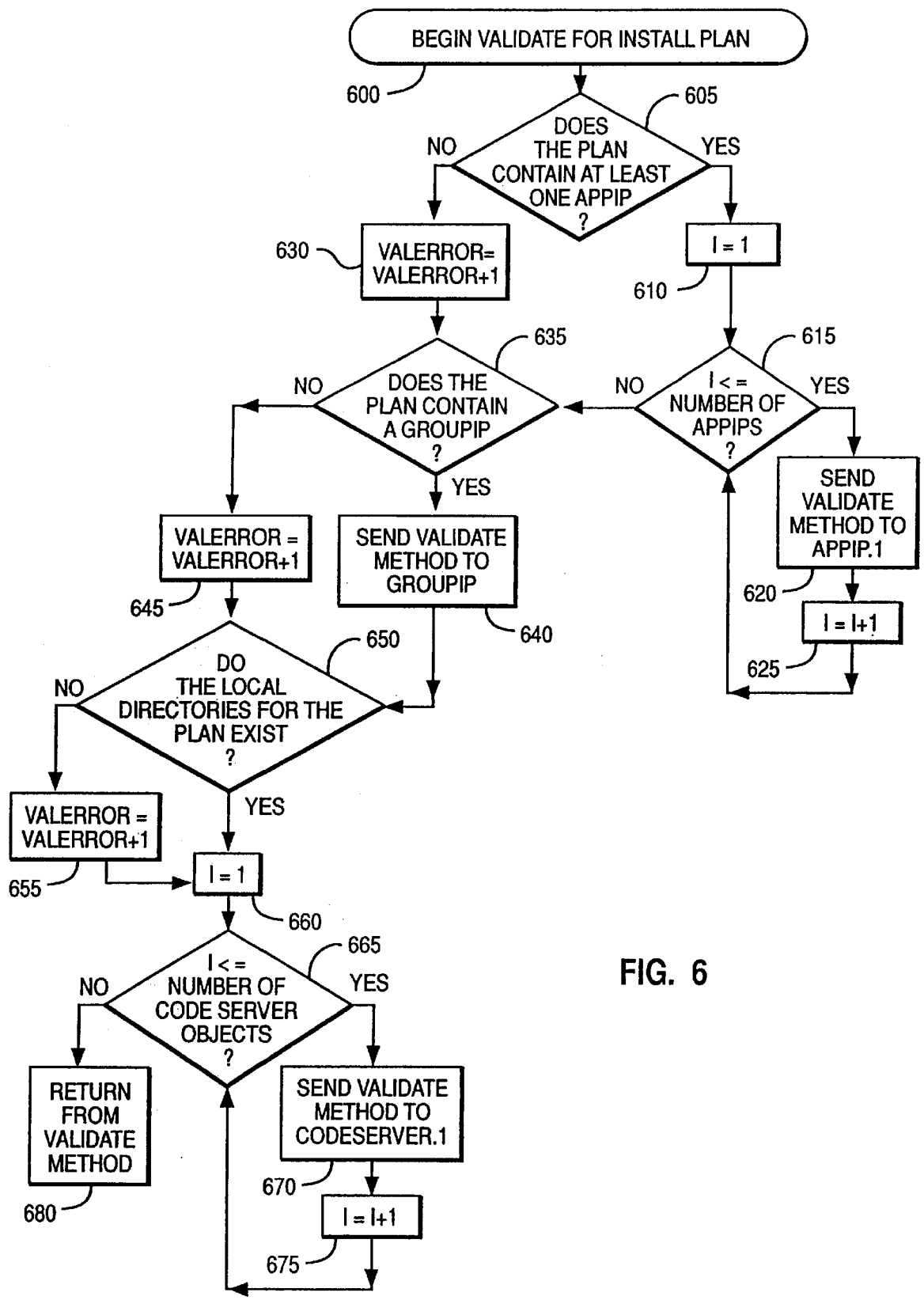
FIG. 6 is a flow diagram of the validation process for an install plan object.

The PREVALIDATE method for the install plan object begins with method entry block 500 in FIG. 5. Prevalidation is different from validation in that it will add objects or attributes to the install plan if they are needed. Validation will only check for correct or incorrect values along with values about which the administrator should be warned since they have the potential to cause problems later in the process. Processing continues to step 505 where the MAINTENANCE SYSTEM REQUIRED FLAG and MAINTENANCE SYSTEM EXISTS FLAG are both set to false. The next step, 510, sets counter I to 1 and continues to decision block 515 where the I counter is checked to see if it is less than or equal to the number of AppIP objects in the install plan. If this condition is true, processing continues to step 535 where the IS MAINTENANCE SYSTEM REQUIRED method is sent to the AppIP object indexed by counter I. After this method returns, processing continues to decision block 540 where the MAINTENANCE SYSTEM EXISTS FLAG is checked to see if it is set to true. If it is not true, the PREVALIDATE method does not need to check the remaining AppIP objects and can end with return block 550. If MAINTENANCE SYSTEM EXISTS FLAG is set to true, processing continues with step 545 where the I counter is incremented by I before continuing with decision block 515.

If decision block 515 was false and all the AppIP objects in the install plan were checked, processing continues to decision block 520 where the MAINTENANCE SYSTEM REQUIRED FLAG is checked to see if it is set to true. If it is true, the PREVALIDATE method can end with return block 550. If the MAINTENANCE SYSTEM REQUIRED FLAG is set to false, processing continues to step 525 where the install plan object creates a new AppIP object from an entry AppObject within the same attributes as an application type of TRANSPORT and action type of MAINTENANCE SYSTEM- For example, in the OS/2 realm, a maintenance system application is a minimal version of the OS/2 program on a workstation's hard disk. This minimal OS/2 does not contain the Presentation Manager or Workplace Shell features of the OS/2 program. The installation action for the OS/2 operating system is one such process that requires a maintenance system. The next step, 530, adds the new AppIP object to the install plan, and the PREVALIDATE method ends in return block 550.

The VALIDATE method for the install plan object begins with method entry block 600 in FIG. 6. Processing continues to decision block 605 where the install plan object checks to see if the install plan contains at least one AppIP object. If it does not, an error is logged in step 630 before processing continues with decision block 635. If the install plan object has at least one AppIP object, step 610 executes next by setting counter I to 1. Decision block 615 follows, where the I counter is checked to see if it is less than or equal to the number of AppIP objects in the install plan object. If it this condition is true, processing continues to step 620 where the VALIDATE method is sent to the AppIP object indexed by counter I. After this method returns, processing continues to step 625 where the I counter is incremented by 1 before continuing with decision block 615.

Figure 8:
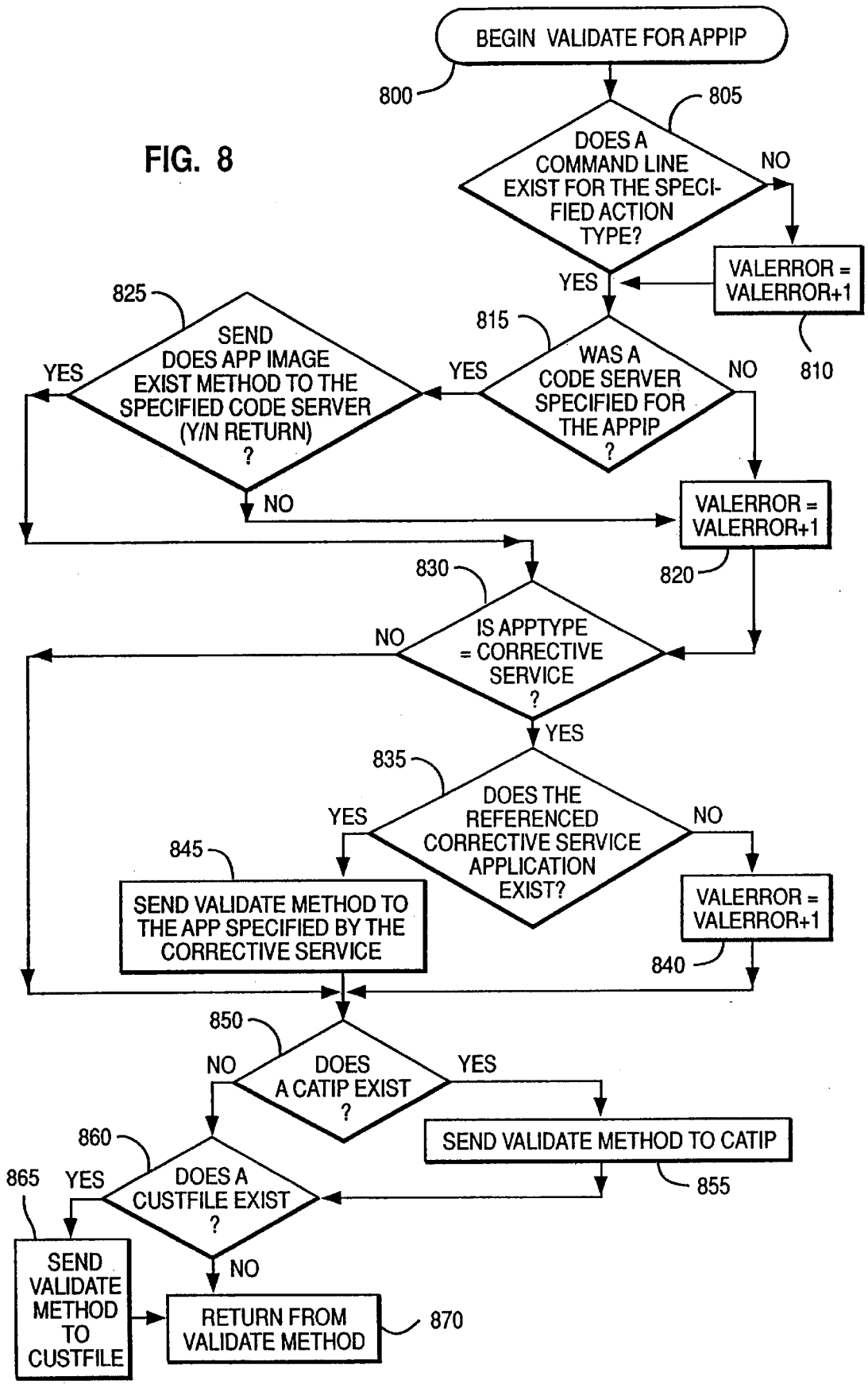
FIG. 8 illustrates the validation process for an application-in-plan object.

If decision block 615 was false and all the AppIP objects in the install plan object ran their validate methods as depicted in FIG. 8, processing continues to decision block 635 where the install plan object checks to see if the plan contains a GroupIP object. If it does not, an error is logged in step 645 before processing continues with decision block 650. If the install plan object has a GroupIP object, the VALIDATE method is sent to the GroupIP object in step 640 which runs its validate method.

In decision block 650, the install plan object checks itself to determine if the local directories, such as where to store the generated response files, were specified correctly and if they exist. If the local directories do not exist, an error is logged in step 655 before continuing to step 660. If all the local directories were specified and do exist, processing continues to step 660 where counter I is set to 1. Decision block 665 follows, where the I counter is checked to see if it is less than or equal to the number of code server objects specified in the install plan object. If this condition is true, processing continues to step 670 where the VALIDATE method is sent to the code server object indexed by counter I. After this method returns, processing continues to step 675 where the I counter is incremented by 1 before continuing with decision block 665. If decision block 665 was false and all the code servers in the install plan object were checked, processing for the VALIDATE method completes in return block 680.

The APPLY CUSTOMIZATION FILES method for the install object plan begins with method entry block 700 in FIG. 7. As mentioned above, this process is used by administrators to modify the values in response files for an application for a particular workstation in an attribute fashion. That is, each workstation may have some values unique to it. Processing continues to step 705 where counter I is set to 1. Decision block 710 follows, where the I counter is checked to see if it is less than or equal to the number of AppIPs specified in the install plan. If this condition is false, the APPLY CUSTOMIZATION FILES METHOD completes with return block 785.

If not all the AppIP objects were checked in decision block 710, processing continues to step 715 where the AppIP object indexed by counter I is checked to determine if it has a CustFile object. If a Custfile object is not found, step 735 increments counter I by 1 and processing continues with decision block 710. If a CustFile object is found, the CustFile is read in step 720 and the install plan object creates a dictionary of keywords and values for each specified WksIP object in the CustFile object. Next, step 725 sets counter J to 1 and decision block 730 checks to see counter J is less than or equal to the number of WksIP objects specified in the CustFile. If this condition is false, processing continues with step 780.

If there are still WksIP objects to be processed in the CustFile object, counter J is set to 1 in step 740. Decision block 745 next checks to see counter K is less than or equal to the number of WksAppIP objects that belong to the WksIP object indexed by counter J. If this condition is false, processing continues with step 780 where counter j is incremented by 1 before decision block 730 is next executed.

If not all of the WksAppIP objects belonging to the WksIP object indexed by counter J were checked decision block 750 checks to see if the WksApp 2p indexed by counter k has the same action type and application type as the AppZp object indexed by counter 1. The processing continues to step 755 where counter k is incremented by 1 and continues to decision block 745. If flag is a match, processing continues to step 760 where the RspFile object corresponding to the CatIP object which belongs to the WksAppIP object indexed by counter K is retrieved. Decision block 765 next checks to see if the RspFile object is of MODEL type. If it is of MODEL type, the RspFile object is transformed into a RspFile object of GENERATED type in step 770. If the RspFile is already of GENERATED type or if it was transformed to the GENERATED type, step 775 applies the CustFile changes to the RspFile object by searching through the RspFile object to replace values in the file corresponding to the values for the keywords in the dictionary for the WksIP object indexed by the counter J. The process would then return to step 755.

The VALIDATE method for application-in-plan (AppIP) objects begins with method entry block 800 in FIG. 8. Processing continues to decision block 805 where the AppIP object checks itself to see if a command line was specified for the selected action type. For example, if the administrator selected CONFIGURE for the action type of the AppIP object, the AppIP object must have a CONFIGURE command line statement specified. If a command line was not specified, an error is logged in step 810 and processing continues with decision block 815.

If a command line was specified for the action type, processing continues to decision block 815 where the AppIP object checks to see if a code server was specified. If a code server was not specified, an error is logged in step 820 and processing continues with return block 830. If a code server was specified, step 825 sends the DOES APPIMAGE EXIST FOR APPIP method to the specified code server object. The return from this method will be a yes or no. If the return is no, an error is logged in step 820. If the return from the method is yes, processing continues with decision block 830.

Decision block 830 checks to see if the application type of the AppIP object is CORRECTIVE SERVICE. A corrective services application is one that applies updates modules, such as a new DLL file, to an application. The update modules can contain fixes to problems and minor enhancements. If the application type is not of CORRECTIVE SERVICE, processing continues with decision block 850. If the application type is of CORRECTIVE SERVICE, a decision block checks to see if the referenced corrective service App object exists in the Applications Container object. A corrective service App object or AppIP object is applied against an App or AppIP object whose type is not CORRECTIVE SERVICE. If the corrective service App does not exist, an error is logged in step 840 and processing continues to decision block 850. If the corrective service App object exists, the AppIP object sends the VALIDATE method to the corrective service App object. When the method returns, processing continues with decision block 850.

Decision block 850 checks to see if a CatIP object exists for the AppIP object in step 855. If a CatIP object exists, the AppIP object sends the VALIDATE method to the CatIP object. When the VALIDATE method returns from the CatIP object or if a CatIP object did not exist for the AppIP object, processing continues with decision block 860 where the AppIP object checks to see if it owns a CustFile object.

If a CustFile object belongs to the AppIP object, the VALIDATE method is sent to CustFile object in step 865. When the VALIDATE method returns from the CustFile or if a CustFile did not exist for the AppIP object, the VALIDATE method processing for the AppIP object completes with return block 870. Those skilled in the art would appreciate many variations in the validate method for the application-in-plan object exist depending on the requirements of the installation engine used.

Figure 9:
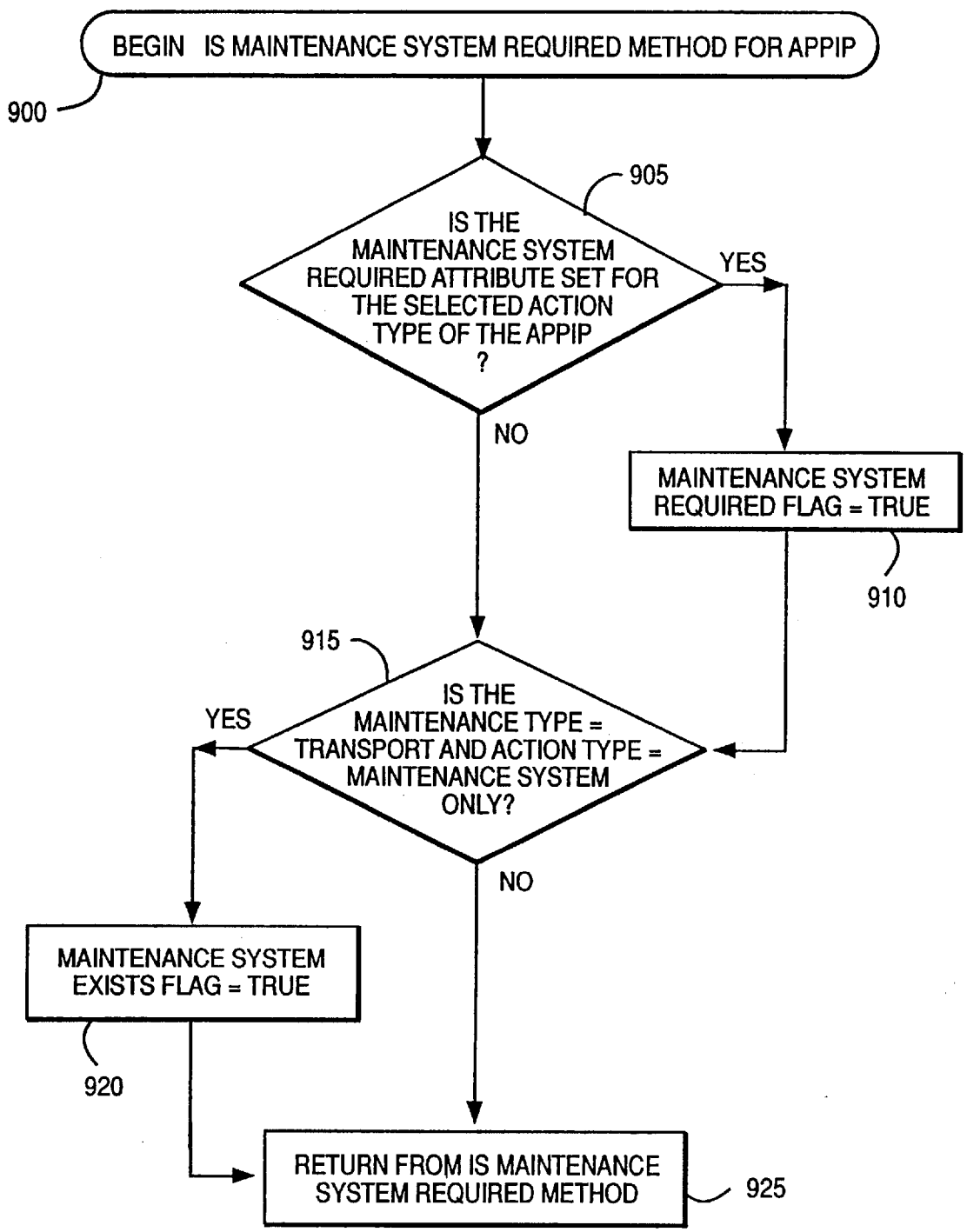
FIG. 9 is a flow diagram for the process for determining whether a maintenance system is required for an application-in-plan object.

The IS MAINTENANCE SYSTEM REQUIRED method for AppIP objects begins with method entry block 900 in FIG. 9. This method is needed in AppIP objects since they need to answer to the plan object if they require a maintenance system application to be part of the plan. Processing continues to decision block 905 where the AppIP object checks itself to see if the maintenance system required attribute was set for the selected action type of the AppIP object. If the attribute was set, step 910 sets the MAINTENANCE SYSTEM REQUIRED FLAG to true and processing continues with decision block 915. If the attribute was not set, decision block 915 gets executed next and here the AppIP object checks to see if this application type was set to TRANSPORT and if its action type was set to MAINTENANCE SYSTEM ONLY. If both types match, step 920 sets the MAINTENANCE SYSTEM EXISTS FLAG to true and processing completes with return block 925. If both types do not match, the IS MAINTENANCE SYSTEM REQUIRED method completes with return block 925.

Figure 10:
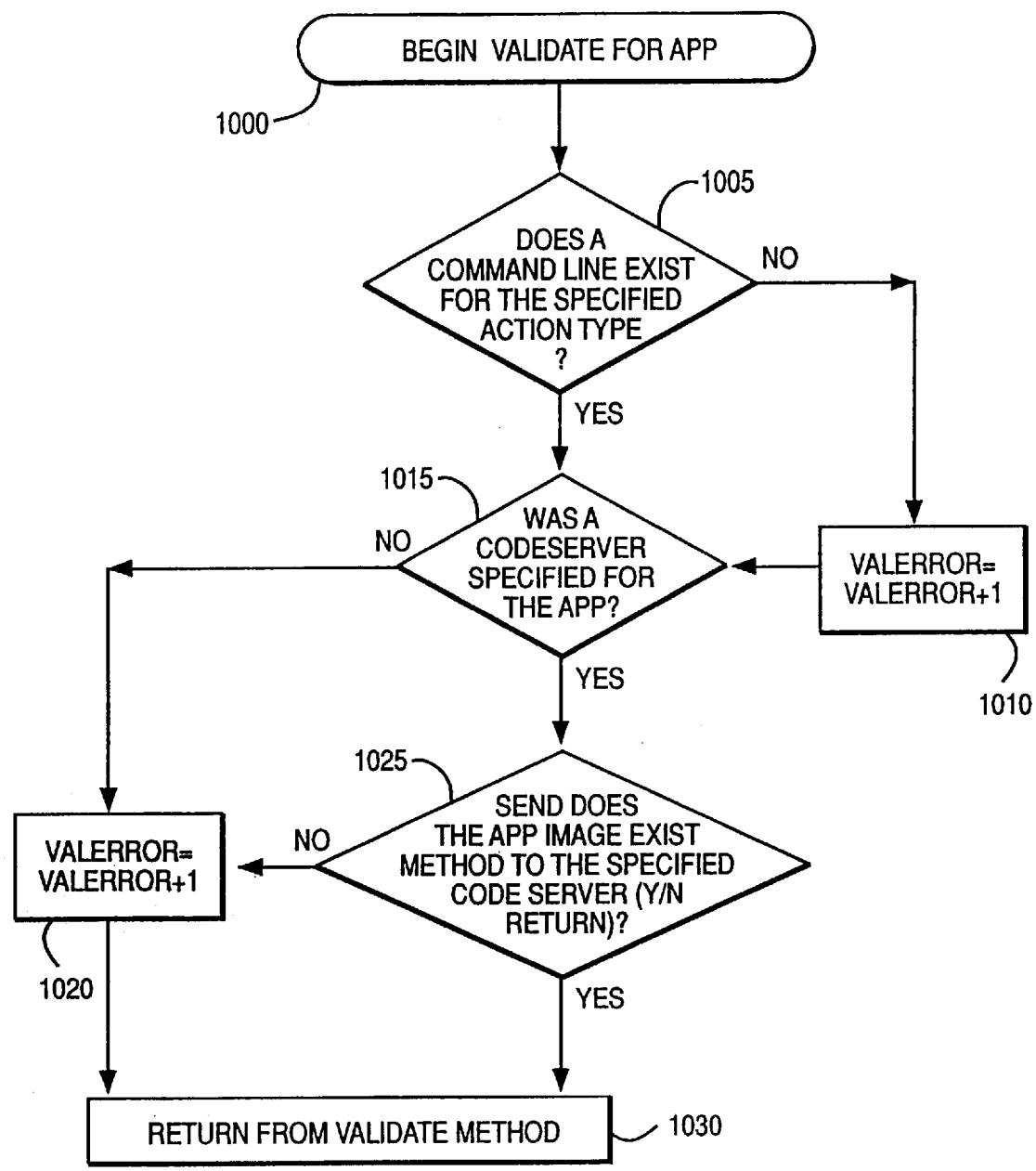
FIG. 10 is a flow diagram for the validation process for application objects which are not in plan but are related to objects in the plan.

The VALIDATE method for App objects begins with method entry block 1000 in FIG. 10. The VALIDATE method for App and AppIP objects are different since App objects do not need to validate their child category objects or validate the objects that can belong to an AppIP object but not to an App object, such as a CustFile object. Processing continues to decision block 1005 where the App object checks itself to see if a command line was specified for the selected action type. If a command line was not specified, an error is logged in step 1010 and processing continues with decision block 1015.

If a command line was specified for the action type, processing continues to decision block 1015 where the App object checks to see if a code server was specified. If a code server was not specified, an error is logged in step 1020 and processing continues with return block 1030. If a code server was specified, step 1025 sends the DOES APPIMAGE EXIST method to the specified code server object. The return from this method will be a yes or no. If the return is no, an error is logged in step 1020. If the return from the method is yes, the VALIDATE method completes with return block 1030.

Figure 11:
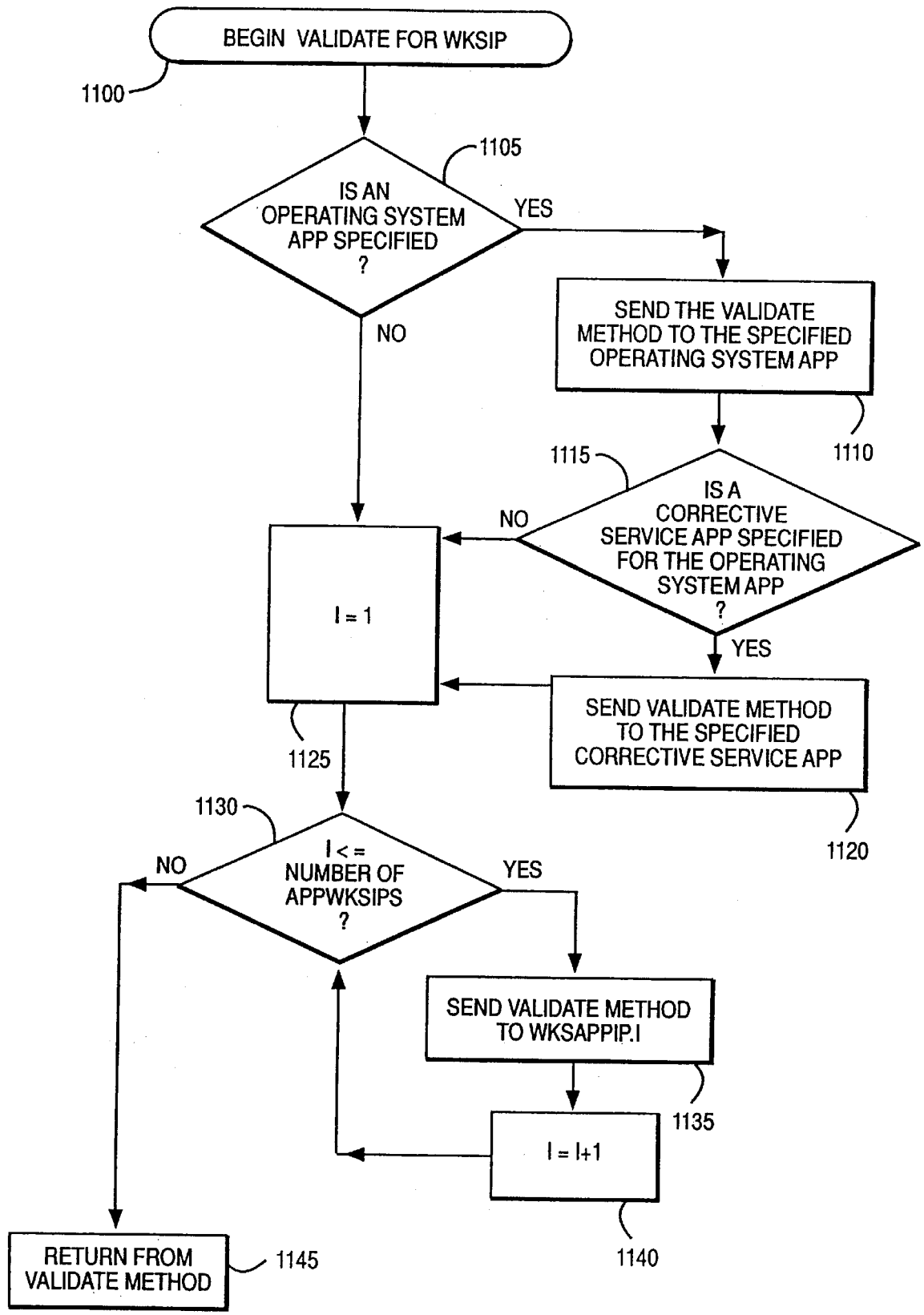
FIG. 11 shows the validation process for a workstation-in-plan object.

The VALIDATE method for workstation-in-plan (WksIP) objects begins with method entry block 1100 in FIG. 11. Processing continues to decision block 1105 where the WksIP object checks itself to see if an operating system App object was specified. If an operating system App object was specified, indicating that the installed operating system on the WksIP object was known by the administrator and set on the object, processing continues to step 1110 where the VALIDATE method is sent to the operating system App object. After the method returns, decision block 1115 checks to see if a corrective service application was specified for the WksIP object. If a corrective service application was specified, processing continues to step 1120 where the VALIDATE method is sent to the corrective service App object. When the VALIDATE method returns, processing continues to step 1125. If a corrective service App-object was not specified, processing also continues to step 1125.

If an operating system App object was not specified, processing also continues to step 1125 where counter I is set to 1. Decision block 1130 follows, where the I counter is checked to see if it is less than or equal to the number of WksAppIP objects in the WksIP object. If this condition is true, processing continues to step 1135 where the VALIDATE method is sent to the WksAppIP object indexed by counter I. After this method returns, processing continues to step 1140 where the I counter is incremented by 1 before continuing with decision block 1130.

If all of the WksAppIP objects belonging to the WksIP object were checked, the VALIDATE method completes with return block 1145.

Figure 12:
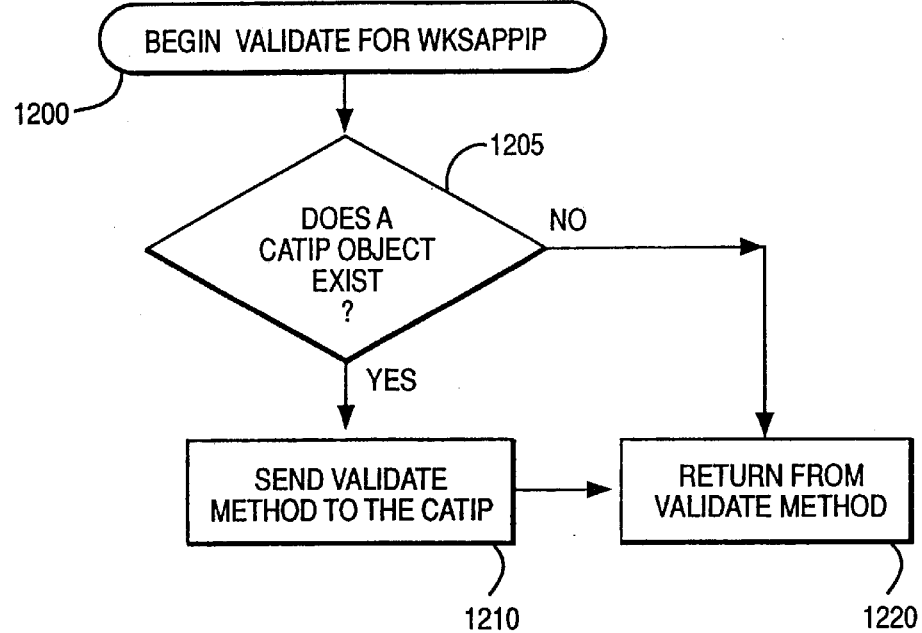
FIG. 12 depicts the validation process for a workstation-application-in-plan object.

The VALIDATE method for WksAppIP objects begins with method entry block 1200 in FIG. 12. Processing continues to decision block 1205 where the AppIP object checks itself to see if it contains a CatIP. If a CatIP object is not found, the VALIDATE method ends with return block 1220. If a CatIP object was found, the WksAppIP object sends the VALIDATE method to the CatIP object in step 1210. After the method returns, processing ends in return block 1220.

Figure 13:
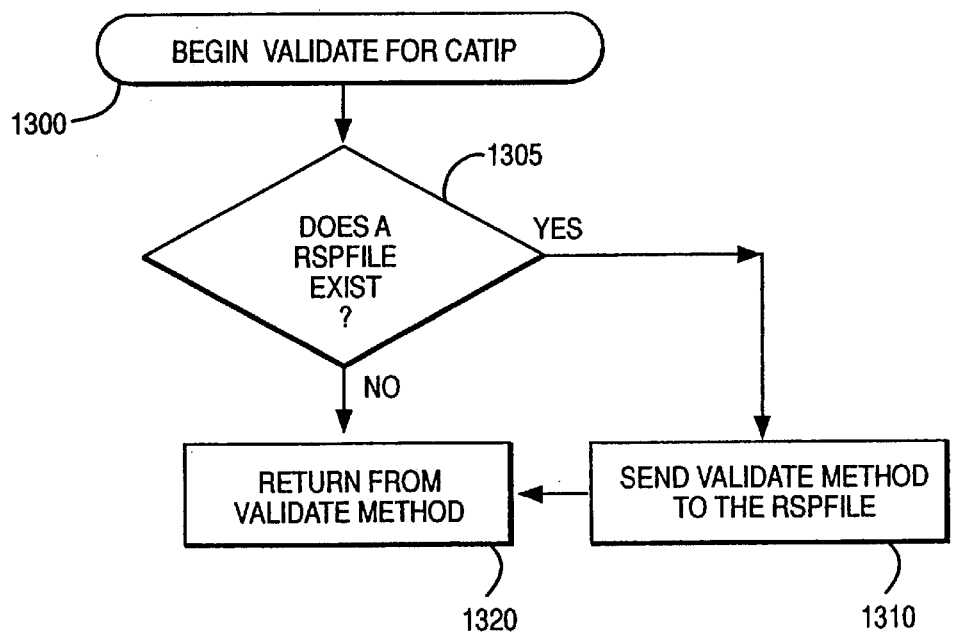
FIG. 13 is a flow diagram for the validation process for a category-in-plan object.

The VALIDATE method for CatIP objects begins with method entry block 1300 in FIG. 13. Processing continues to decision block 1305 where the CatIP object checks itself to see if it contains a RspFile object. If a RspFile object is not found, the VALIDATE method ends with return block 1320. If a RspFile object was found, the CatIP object sends the VALIDATE method to the RspFile object in step 1310. After the method returns, processing ends in return block 1320.

Figure 14:
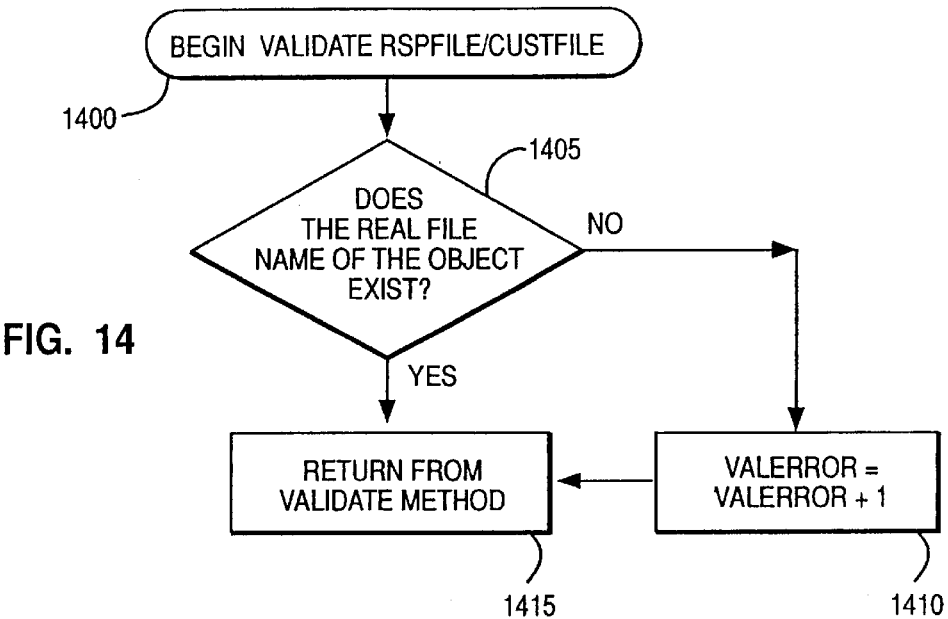
FIG. 14 shows the validation of the response file and customization file objects.

The VALIDATE method for RspFile and CustFile objects begins with method entry block 1400 in FIG. 14. Processing continues to decision block 1405 where the file object checks to see if its real file name physically exists as a file on a locally accessible drive. If the file name cannot be found on a local or network accessible drive, an error is logged in step 1410 and processing continues to return block 1415. If the file name was located, the VALIDATE method ends in return block 1415.

Figure 15:
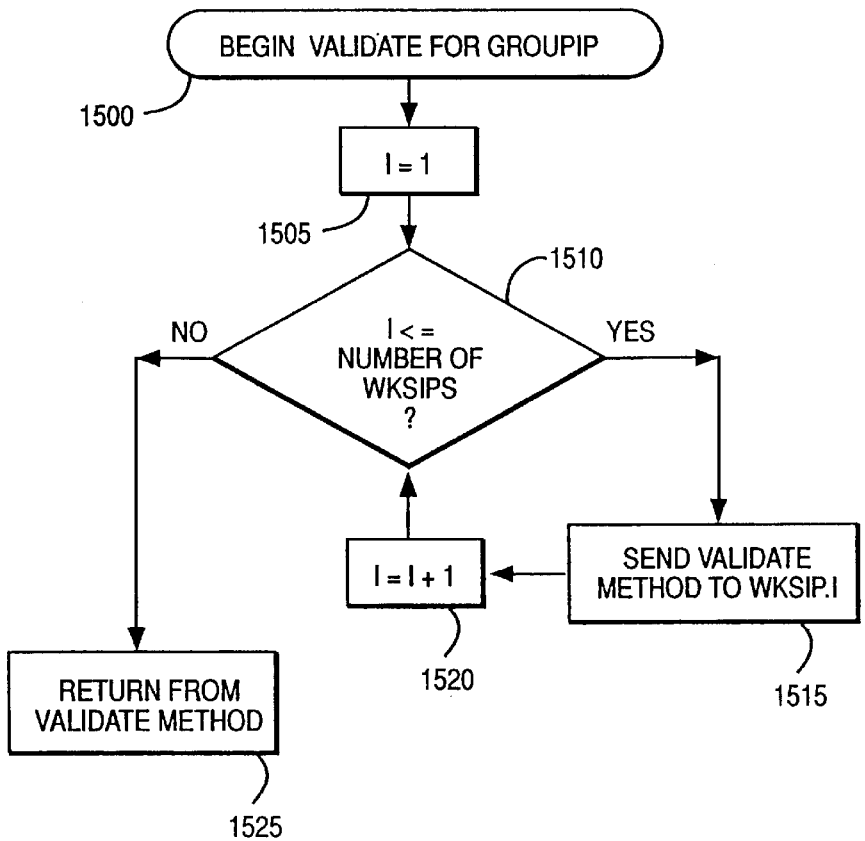
FIG. 15 is a flow diagram for validation of a group-in-plan object.

The VALIDATE method for group-in-plan (GroupIP) objects begins with method entry block 1500 in FIG. 15. Processing continues to step 1510, where counter I is set to 1. Next, decision block 1515 checks to see if the I counter is less than or equal to the number of WksIP object in the GroupIP object. If this condition is true, processing continues to step 1515 where the GroupIP object sends the VALIDATE method to the WksIP object indexed by counter I. After this method returns, processing continues to step 1520 where the counter I is incremented by 1 and control returns to decision block 1510. If decision block 1510 was false and all the WksIP objects in the GroupIP object were checked, the VALIDATE method ends with return block 1525.

Figure 16A:
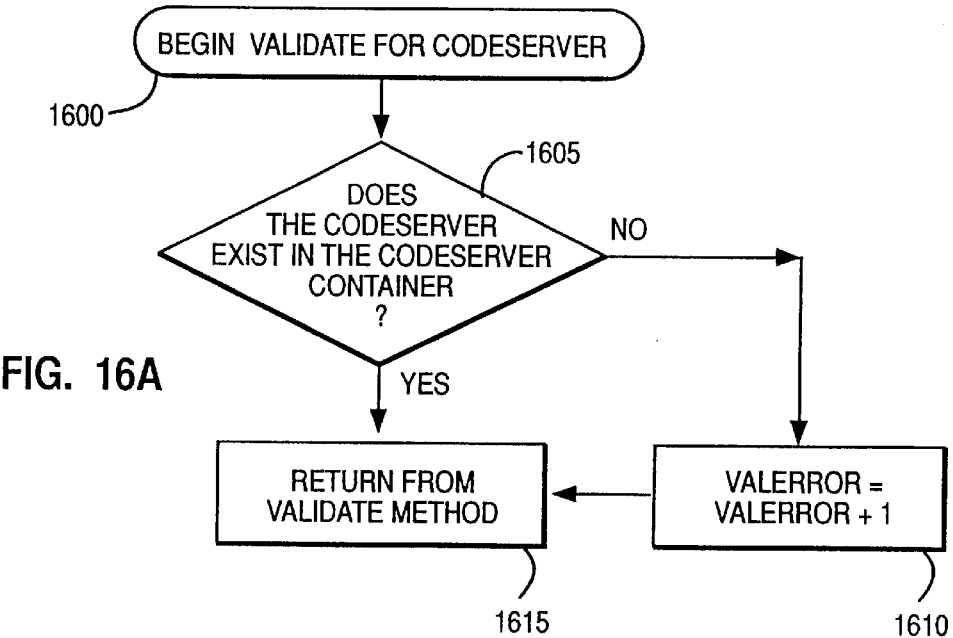
FIG. 16A illustrates the validation process for code server objects.

The VALIDATE method for code server objects begins with method entry block 1600 in FIG. 16A. Processing continues to decision block 1605 where the code server container is checked to see if the code server object is actually defined and not just referenced in another object. If the code server was not found, an error is logged in step 1610 and the method completes in return block 1615.

Figure 16B:
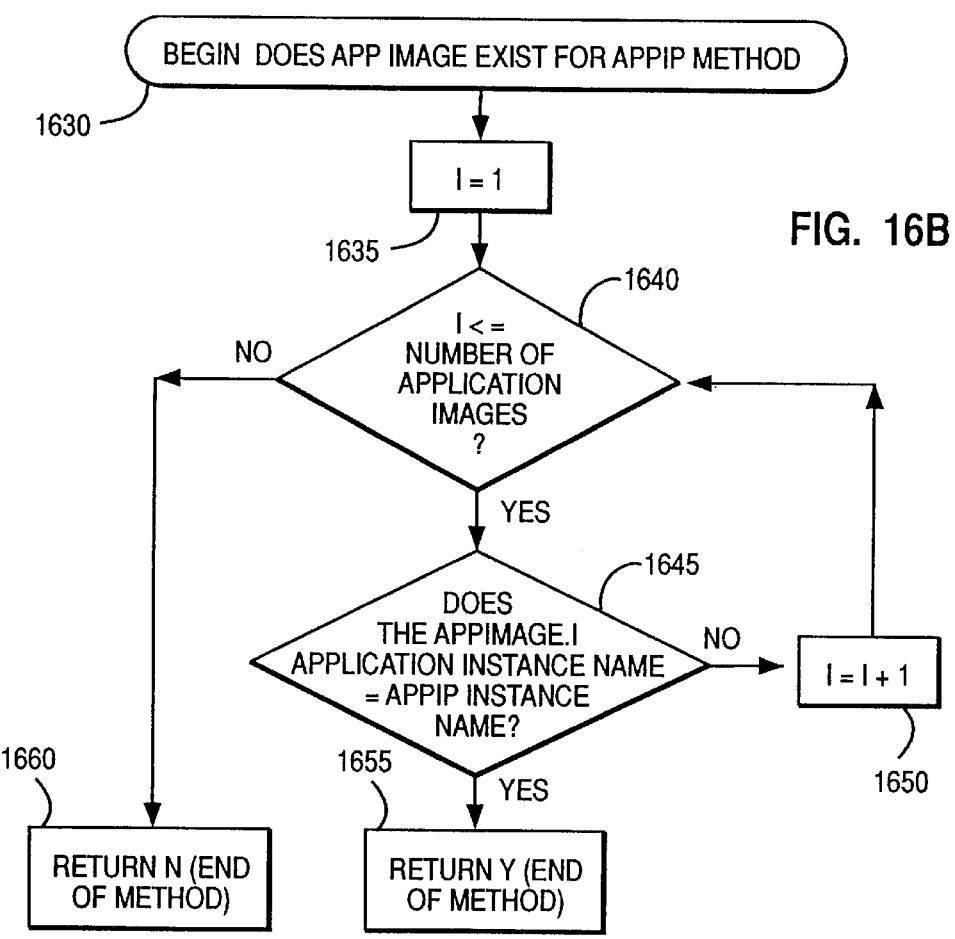
FIG. 16B depicts the process for checking whether an application image exists for an application-in-plan object for a code server object.

The DOES APPIMAGE EXIST FOR APPIP method for code server objects begins with method entry block 1630 in FIG. 16B. Processing continues to step 1635 where counter I is set to 1. Next, decision block 1640 checks to see if the I counter is less than or equal to the number of applications images in the code server. If this condition is true, processing continues to step 1645 where the application instance name specified as an attribute in the application image is checked against the instance name of the AppIP. If the two match, the DOES APPIMAGE EXIST FOR APPIP method ends and a yes (Y) is returned. If the two names do not match, the counter I is incremented by 1 in step 1650 and processing continues with decision block 1640. If decision block 1640 was false and all the application images in the code server were checked, the DOES APPIMAGE EXIST FOR APPIP method ends and a no (N) is returned.

The INSTALL COMMAND SCRIPT GENERATION routine reads the Plan Output File (POF file) created by the install plan object. The Plan Output File and its sections are shown in FIG. 17A. The Plan Section 2002 contains data specific to the plan, such as the plan name and server names to use for response files, log files, and utility files. The Plan Section also contains a Sequence Section 2004 and one or more App Sections 2006, Workstation Sections 2012, and Server Sections 2018. The Sequence Section 2004 lists each application/action in the order it is to be run during plan execution on the workstation. The App Sections 2006 contain data specific to each application in the plan such as the short name, action, command line, image server and alias, and environment required. The Workstation Sections 2012 contain data specific to each workstation such as workstation name, boot drive, and operating system short name. For each server that is referenced in the plan, there is a Server Section. The Server Sections 2022 contain the server name, and its aliases (mount points) for response files, log files, and utility files. It is convenient to have a Plan Output File rather than simply generate the files for the installation engine directly as the install plan object code is more portable for many different installation engines. Only the command script generation routines discussed below need be rewritten.

The INSTALL COMMAND SCRIPT GENERATION routine creates a Plan Status File that serves as a base for showing the progress of a plan in the graphical user interface as it is executed on the workstations in the plan. The Plan Status File and its sections are shown in FIG. 17B. The Plan Section 2032, contains data specific to the plan. A Workstation Section 2034 will be included for each workstation in the plan. Each Workstation Section will include a Workstation Log 2036 for each log file that is indicated each application command line in the plan. Each Workstation Section will also include a Workstation Status File 2042 that points to the file containing the overall status, e.g., in progress, success, failure, of the plan on the workstation.

The INSTALL COMMAND SCRIPT GENERATION routine also creates four files for each workstation that is in the plan. The four files are the Workstation Queue File shown in FIG. 18A, the PRE Command File FIG. 18B, the POST Command File shown in FIG. 18C, and the LCU Command File shown in FIG. 18D.

Workstation Queue File in FIG. 18A consists of the names of the plans 2062 that are waiting to be executed on the workstation. This file is used by another program, NWICheck, which is the queuing mechanism for multiple plans that runs at the target workstation. As plans are executed on the target workstation, this other program removes the executed plan from the top of the queue. This queuing mechanism is an important advantage of the present invention over prior efforts in the network installation of application programs. By allowing multiple plan objects to be executed sequentially, the job of organizing the installation of multiple applications over multiple workstations can be compartmentalized, and thus, much easier. Prior efforts allowed but a single installation to be active at a time which had to be removed.

The PRE Command File, shown in FIG. 18B, is used to enable the workstation to execute the plan if the workstation does not initiate the plan execution from boot diskettes. The PRE Command File is written in standard command language. It contains one or more Attach Installation statements 2072 and a Network Installation Enablement statement 2078. The Attach Installation statements 2072 will add redirected drives to the workstation that will be active across reboots that are required during plan execution. The Network Installation Enablement statement 2078 installs the necessary files and/or commands that will facilitate plan execution across reboots of the workstation. The POST Command File, shown in FIG. 18C, is used to remove the redirected drives and the Network Installation Enablement program that was installed on the workstation by the PRE Command File or during plan execution. The Remove Attach statements 2088 remove the redirected drives. The Remove Network Installation Enable statement 2078 removes the files and/or commands previously installed by the Network Installation Enablement Program.

The LCU Command File, shown in FIG. 18D, is a REXX Command file written in the syntax and uses the variables required by the LAN CID Utility program. The INSTALL COMMAND SCRIPT GENERATION routine dynamically creates the REXX code required to do multiproduct installations in several phases while keeping the. number of reboots required to a minimum. The code is generated to handle workstations that initiate plan execution from boot diskettes or other hard disk based methods. The LCU Command File has seven sections. The Setup section 2092 consists of the initialization of variables. The Base LCU Procedure section 2104 consists of various REXX procedures that are used for such things as rebooting the machine, and processing CID return codes. The REXX code that the INSTALL COMMAND SCRIPT GENERATION routine creates begins in the Attach Section, 2094. The Attach Section 2094 contains the redirection type specific attach (mount) statements for all of the redirected drives necessary to execute the plan on the workstation. There would be attaches for all of the application images, log files, response files, and other things. The Variables Section 2096 sets up some variables that are specific to the workstation, such as the boot drive. The Product Data section 2098 contains statements for each application in the plan in the syntax required by LAN CID Utility. These statements would include the command line for the application and default response file among other things. The Install Section 2100 contains the application sequencing, error action, and reboot information. The CheckIT Procedure 2102 is a Network Installation procedure that is called from within the Install section on error conditions and at the end of the installation.

Figure 19:
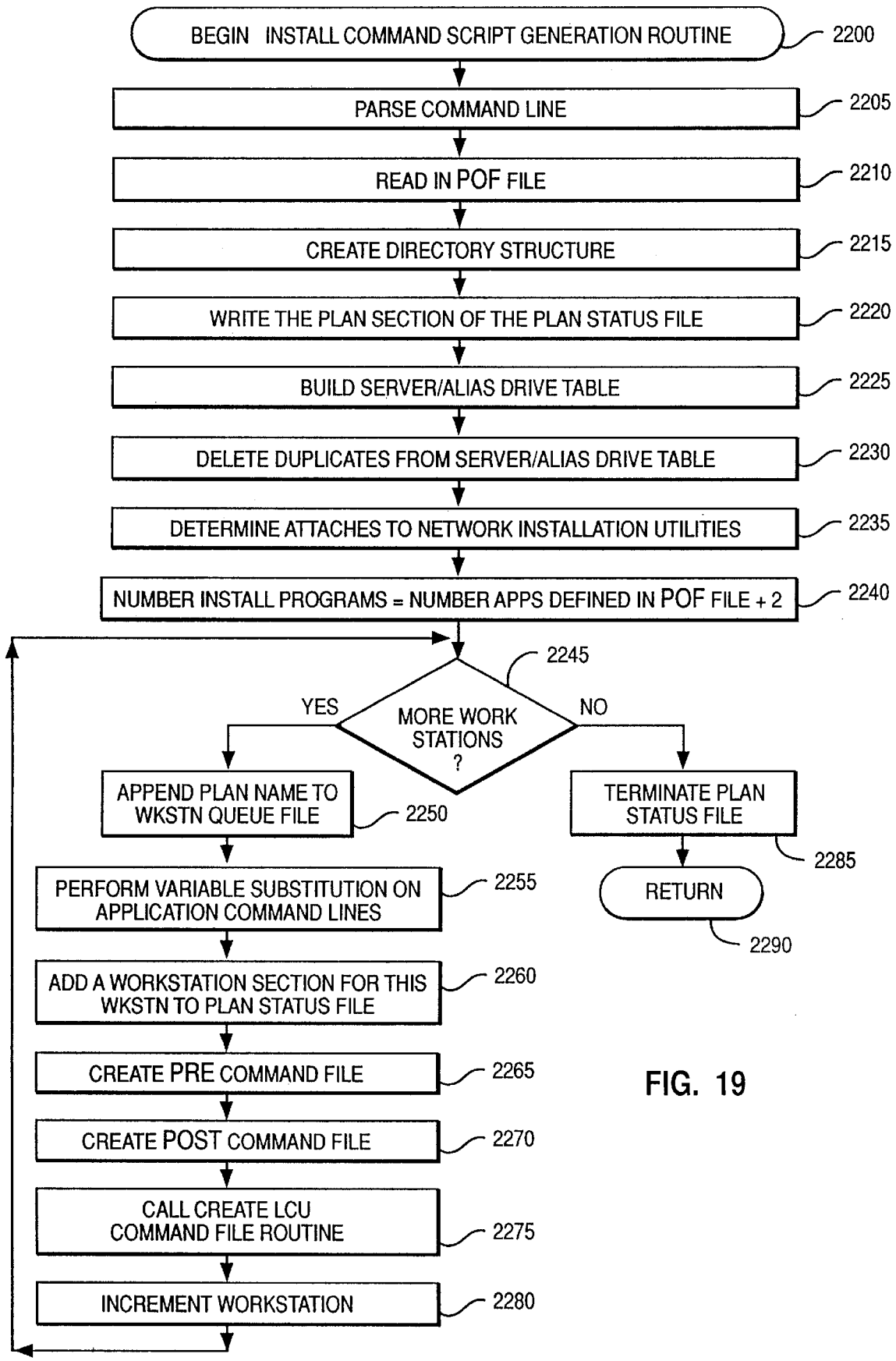
FIG. 19 is a flow diagram of the process to generate an install command script.

The INSTALL COMMAND SCRIPT GENERATION routine begins with block 2200 in FIG. 19. In step 2205, the command line is parsed for data such as the plan output file (POF) file name, and the log file name. Processing continues to step 2210 where the POF file passed on the command line is read in and parsed for the required data, such as server information for each code server referenced in the installation plan. The POF file structure is shown in FIG. 17A.

The next step, 2215, is to create the directory structure required by the plan in the target directory. The directory structure is predicated by the tools used to execute the plan on the workstation. Those skilled in the art would understand that the directory structure may vary substantially from that described in the preferred embodiment below. In the target directory, a directory is created for the plan. From this plan directory, a directory is created for the log files containing for each application in the plan, the LCU command files, the PRE command files, the POST command files, and the network installation status files. Using the LAN CID Utility, separate directories must be created for each of these files since the files are named by the workstation and two separate files by the same name cannot reside in the same directory.

Processing continues to step 2220 where the plan section of the Plan Status File is written. The structure of the Plan Status File is shown in FIG. 17B. Then in step 2225, the server/alias drive table is built. This table includes all of the servers and their corresponding aliases (mount points) that are to be used in the execution of the plan on the target workstation. A mount point on a server is a logical location to which an application can attach as a drive letter. After all of the server/alias combinations have been added to the table, the duplicates are removed in step 2230 and drives are assigned to the unique server/alias combinations. Drive Z: will be assigned to the drive that will be the network installation utilities alias. Drive Y: will be assigned to the drive that will attach to operating system specific files. The rest of the unique server/alias combinations will be assigned drive letters in reverse alphabetical order starting from drive W:. The drives are assigned in reverse alphabetical order to help avoid conflicts with existing drive letters used by devices physically attached to the target workstation, although other device assignments are possible.

In step 2240, the number of applications to be installed during execution of the plan is determined. This will be defined as the number of applications defined in the POF file plus two. One is added for the network installation enablement program and one is added for a transient redirector that is installed in some cases.

The INSTALL COMMAND SCRIPT GENERATION routine will then loop through steps 2245 through 2280 for all of the workstations defined in the POF file. The first step in the loop, 2250, is to append the name of the current plan to the workstation's Queue file. The structure of the Workstation Queue File is shown in FIG. 18A. The next step, 2255, is to perform variable substitution on the applications' command lines. Data such as source directory, log file, and client name are specific to each plan and/or workstation, therefore, they must be substituted at plan commit time rather than being fixed by the administrator when the application is defined to the system. Next, step 2260, is a workstation section for the current workstation in the Plan Status File. The Plan Status File is shown in FIG. 17B. The local path relative to the server of the workstation's status file along with each log file specified by a /1: parameter on each application command line will be listed in the Plan Status File.

Next, in step 2265, the process creates the workstation's PRE Command File. The structure of the PRE Command File is shown in FIG. 18B. An attach installation enablement statement will be added for the network installation utilities alias as determined in step 2230. An attach installation statement is a program that installs a statement into an operating system's startup files and attach a statement to a file server. An attach installation statement will also be added for operating system specific files if needed. The appropriate network installation statement for the current workstation will also be added. In step 2270, the POST Command File is created. The structure of the POST Command File is shown in FIG. 18C. Statements will be added to basically 'undo' what was done in the PRE command file (or equivalent in the LCU command file).

Figure 20:
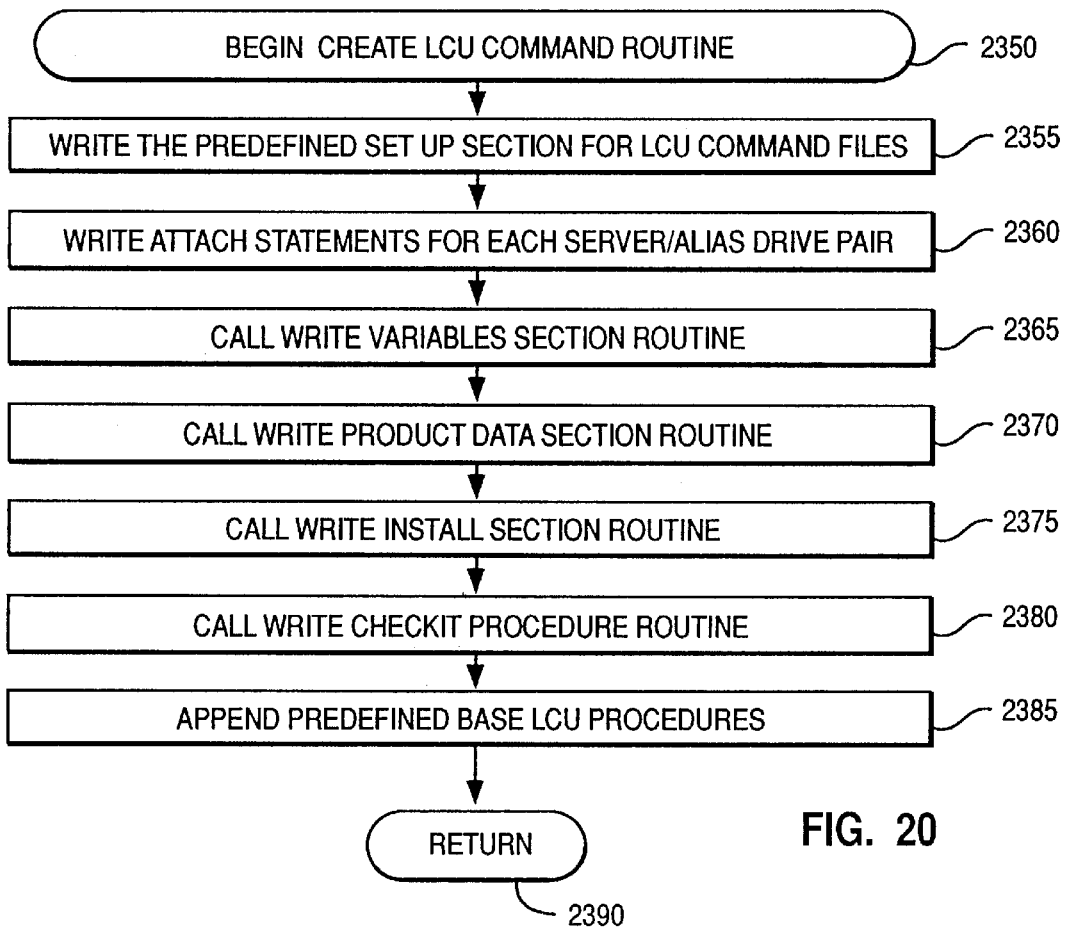
FIG. 20 a flow diagram of the LCU command creation process.

The INSTALL COMMAND SCRIPT GENERATION routine will then call the CREATE LCU COMMAND FILE routine in step 2275. The CREATE LCU COMMAND FILE routine is shown in FIG. 20. The next step is to proceed to the next workstation and go on to the 2245 decision block. If there are more workstations to process, steps 2250 through 2280 will be repeated, if not, the INSTALL COMMAND SCRIPT GENERATION routine will close the Plan Status File, step 2285, and return to the calling program.

The CREATE LCU COMMAND FILE routine begins with block 2350 in FIG. 20. The structure of the LCU Command file is shown in FIG. 18D. The first step in creating the LCU command file is to write out the predefined setup section for LCU command files, step 2355. The setup section is specific to the LAN CID Utility, however, if other installation engines were used, it is likely that similar sections would be common to these files. In step 2360, network specific attach statements are written for drives for each unique server/alias pair that was determined in step 2230 of the INSTALL COMMAND SCRIPT GENERATION routine. In steps 2365 through 2380, the CREATE LCU COMMAND FILE routine will call the WRITE VARIABLES SECTION routine (shown in FIG. 21A), the WRITE PRODUCT DATA SECTION routine (shown in FIG. 21B), the WRITE INSTALL SECTION routine (shown in FIG. 23), and the WRITE CHECKIT PROCEDURE routine (shown in FIG. 22). In step 2385, the predefined base procedures copied in step 2355 above for LCU Command files will be written to the workstation's LCU command file. The CREATE LCU COMMAND FILE routine will then return to the calling procedure.

Figure 21A:
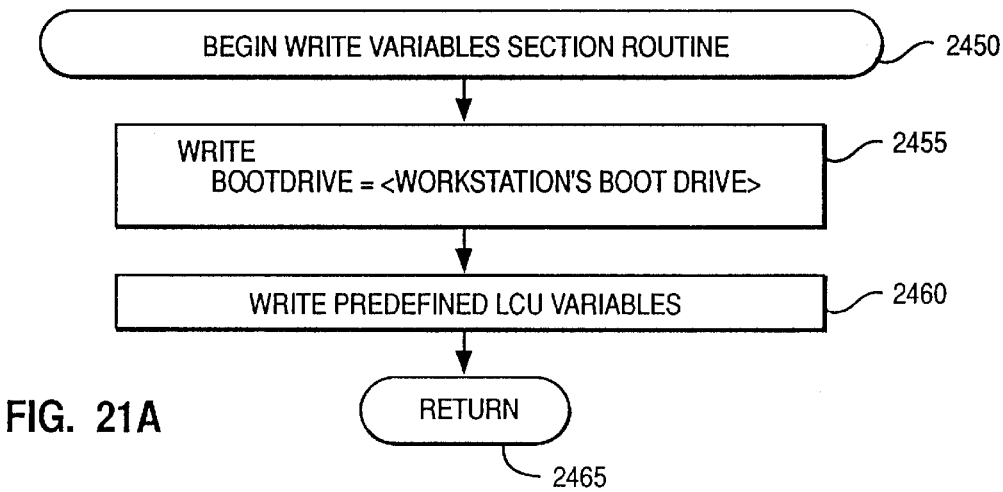
FIGS. 21A and 21B depict the processes for writing the variable section and the product data sections respectively.

The WRITE VARIABLES SECTION routine begins with step 2450 in FIG. 21A. This routine writes out variables that are specific to the workstation. First, in step 2455, the process writes a REXX variable that corresponds to the workstation's boot drive. In REXX syntax, this might be bootdrive=D:, for example. Next, step 2460, the predefined variables which LCU will use during plan execution on the workstation are written to the file. The WRITE VARIABLES SECTION routine will then return to the calling procedure in return block 2465.

Figure 21B:
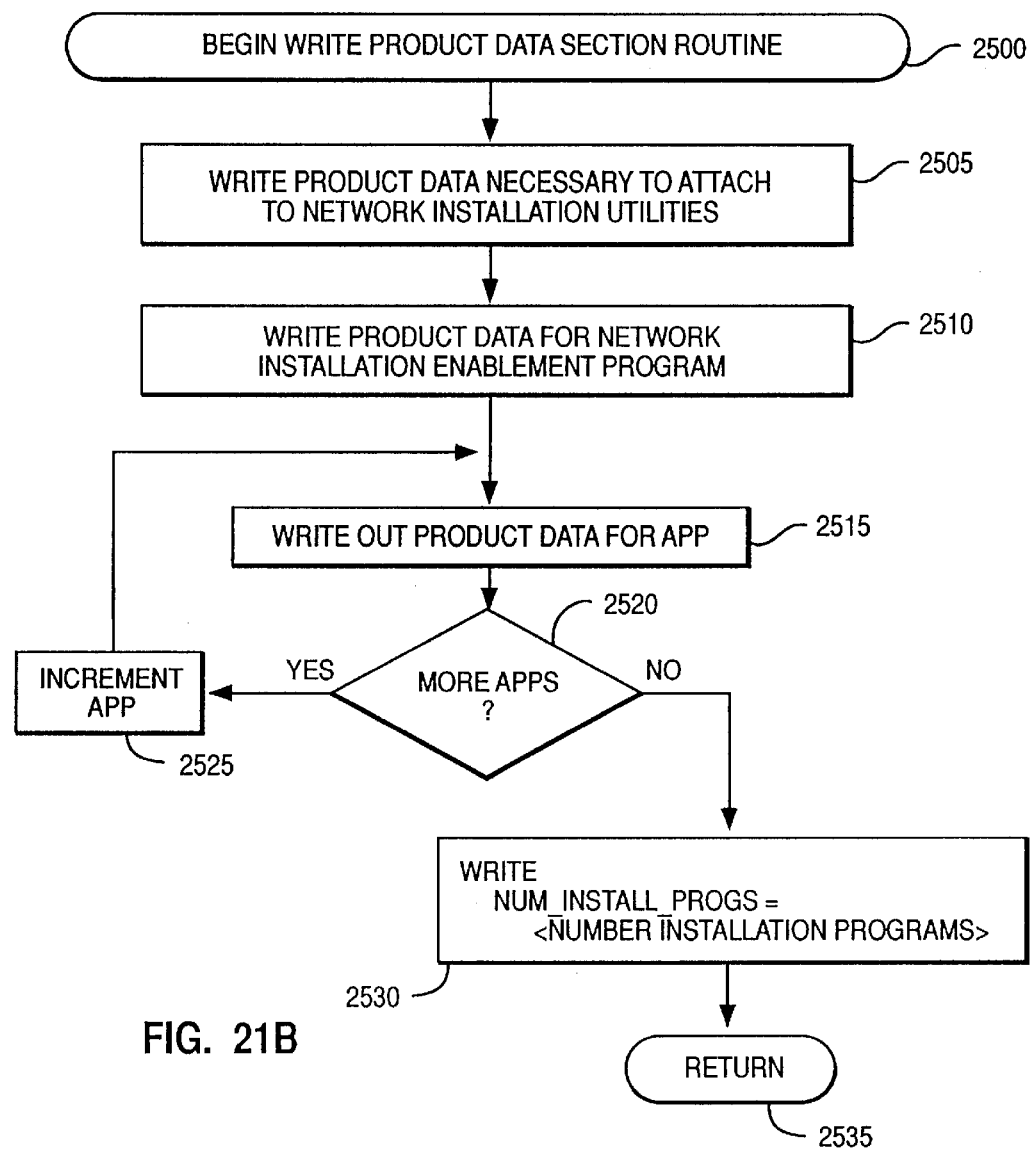

The WRITE PRODUCT DATA SECTION routine begins with step 2500 in FIG. 21B. The components of the Product Data Section are explained in box 2098 of FIG. 18D. In step 2505, the product data that is necessary to attach to the network installation utilities is written to the section. This would be the same as was written in the PRE command file as explained in step 2260 of the INSTALL COMMAND SCRIPT GENERATION routine. If necessary, the product data necessary to attach to the operating specific files would also be written in this step. In step 2510, the product data for the network installation enablement program is written. The network installation utility runs the installation, the network installation enablement program installs the network installation utility. The loop in steps 2515 through 2525 will write out the product data for each application that is to be installed in the plan. After all of the product data has been written out, a line which indicates how many product data definitions are included in the command file is written out. This number was determined in step 2240 of the INSTALL COMMAND SCRIPT GENERATION routine. The WRITE PRODUCT DATA SECTION routine will then return to the calling procedure.

Figure 22:
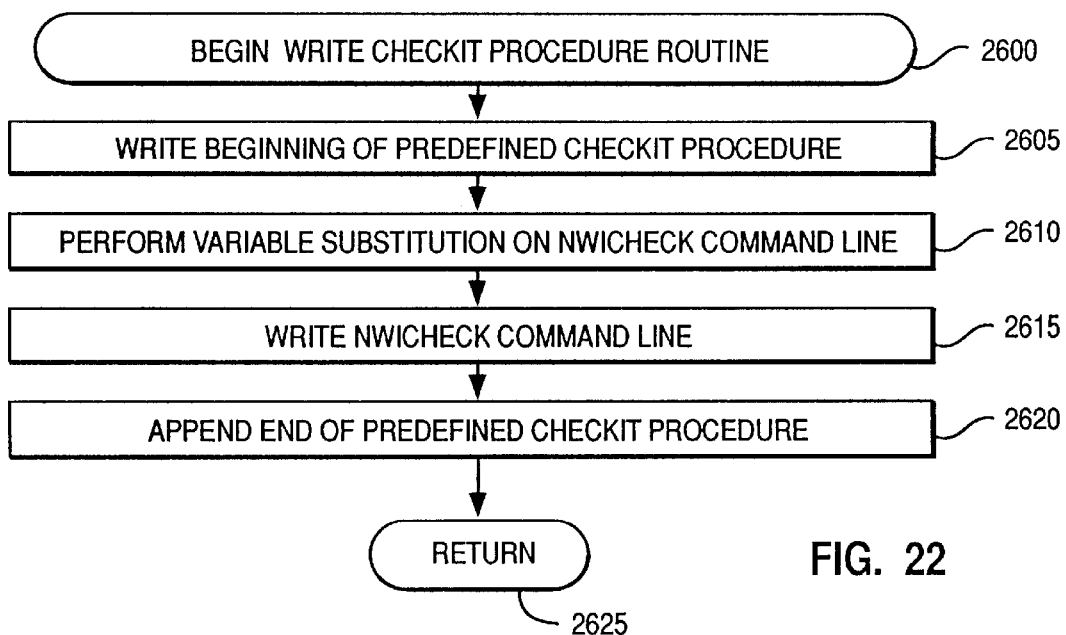
FIG. 22 shows the write check-it procedure.

The WRITE CHECKIT PROCEDURE routine begins with step 2600 in FIG. 22. The CheckIt procedure is a procedure that is added to the LCU REXX command file. The CheckIt procedure is called whenever an application installation fails or at successful plan completion. The CheckIt procedure will call another program passing to it the workstation's name and the status of the plan (success or failure). This other program, NWICHECK, will maintain the workstation's queue file and status file during plan execution. First, in step 2605, the predefined beginning of the CheckIt procedure is written. Next, in step 2610, variable substitution on the NWICHECK command line is performed, substituting data such as workstation name, and log file. The NWICHECK statement produced in step 2610 is written out to the command file in step 2615. The rest of the CheckIt procedure is appended in step 2620. The WRITE CHECKIT PROCEDURE routine will then return to the calling procedure.

Figure 23:
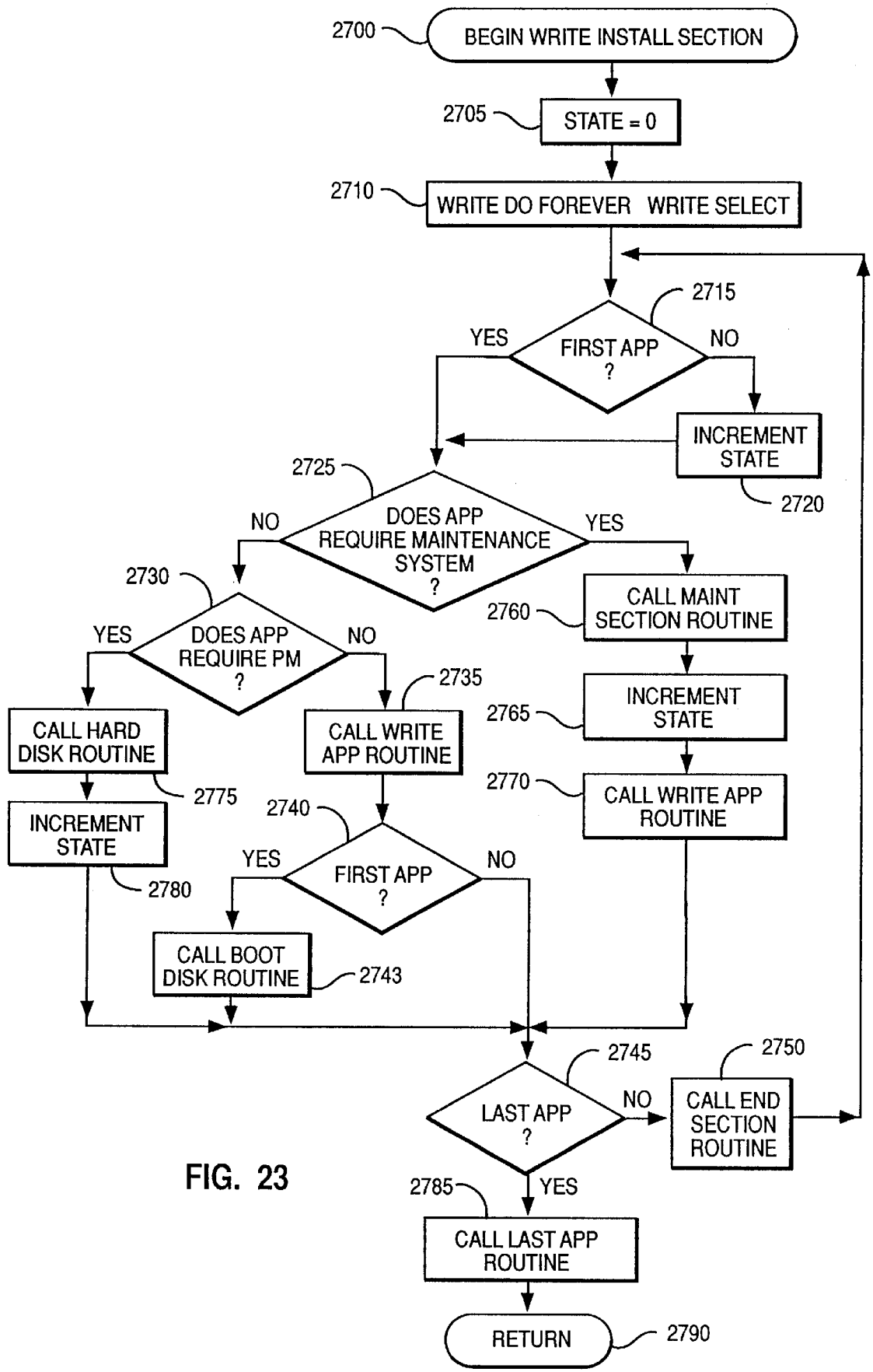
FIG. 23 is a flow diagram for writing an install section.

The WRITE INSTALL SECTION routine begins in step 2700 in FIG. 23. The components of the Install Section are explained in box 2100 of FIG. 18D. The first step, 2705, is to set the state to 0. Next, in step 2710, write out the REXX constructs of the loop The WRITE INSTALL SECTION routine will then loop through all of the applications in the plan starting in decision block 2715.

Decision block 2715 tests if this is the first application being processed, if it is not, the state is incremented by 1 in state 2720, if it is, processing continues to decision block 2725.

Decision block 2725 checks if the application requires a maintenance system. If it does, processing continues to step 2760, where the MAINT SECTION routine (FIG. 26) is called. In step 2765, the state is incremented by 1, then the WRITE APP routine (FIG. 24) is called in step 2770. Processing then continues to decision block 2745.

If, in decision block 2725, a maintenance system was not required, processing continues to decision block 2730 where it is checked if the application requires the Presentation Manager (PM) be active during installation. Presentation Manager allows an application to present a graphical user interface to a user without needing to manage the interface itself. If PM is required, processing continues to step 2775 where the HARD DISK routine (FIG. 28) is called. The state is then incremented by 1 in step 2780 and processing continues to decision block 2745. If, in decision block 2730, PM was not required, processing continues to step 2735 where the WRITE APP routine (FIG. 24) is called. Processing continues to decision block 2740 where if this is the first application being processed, the BOOT DISK routine (FIG. 27) is called in step 2785, otherwise, processing continues to decision block 2745.

In decision block 2745, if the last application is not being processed, then processing continues to step 2750 where the END SECTION routine (FIG. 25C) is called. Processing then returns to the 2715 decision block. If, in decision block 2745, the last application is being processed, then processing continues to step 2785 where the LAST APP routine is called The WRITE INSTALL SECTION routine will then return to the calling procedure.

Figure 24:
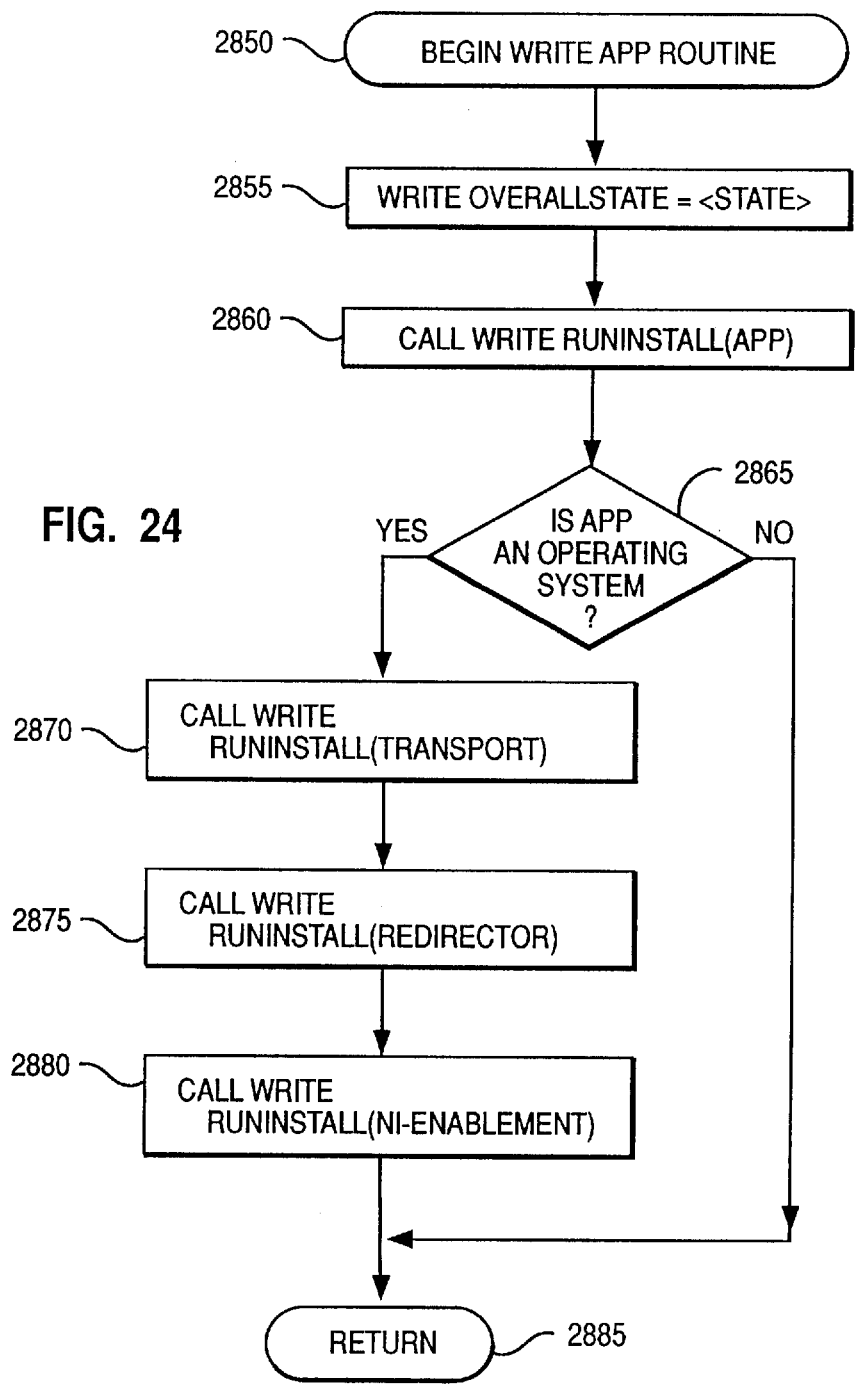
FIG. 24 is a flow diagram for writing the application routine.

The WRITE APP routine begins with step 2850 in FIG. 24. This routine writes out one or more RunInstall statements for a single overall-state in the command file. In step 2855, the REXX syntax indicating the proper section of the select statement is written out. Then, in step 2860, the WRITE RUNINSTALL routine (FIG. 25A) is called for the application being processed. This routine writes out the logic for a single RunInstall statement in the command file. Processing continues to decision block 2865 where if the application being processed is not an operating system, then the routine returns to the calling procedure. Otherwise, processing continues to step 2870 where the WRITE RUNINSTALL routine is called for the transport application defined in the plan. Then, in step 2875, the WRITE RUNINSTALL routine is called for the redirector that is in the plan. In step 2880, the WRITE RUNINSTALL routine is called for the network installation enablement program. The WRITE APP routine will then return to the calling procedure in return block 2885.

Figure 25A:
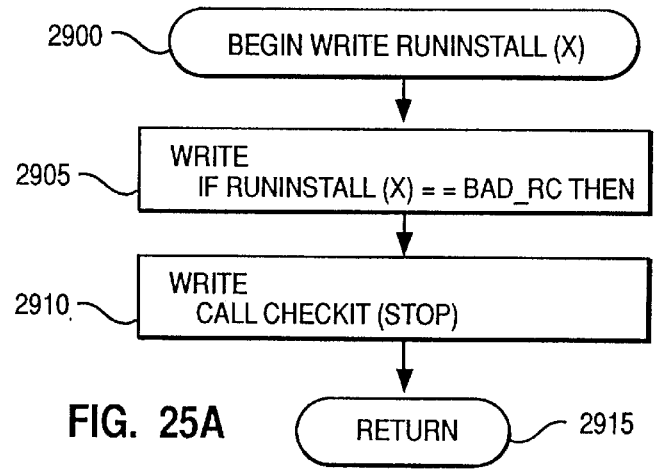
FIGS. 25A, 25B and 25C are flow diagrams for the write run install, the begin last application and the begin end section routines.

The WRITE RUNINSTALL routine begins with step 2900 in FIG. 25A. In steps 2905 and 2910, the REXX syntax is written out to the command file as follows:

If RunInstall(x)==BAD_RC then
   Call Checkit('STOP')

Where x is the application short name for the application for which this routine was called. The WRITE RUNINSTALL routine then returns to the calling procedure.

Figure 25B:
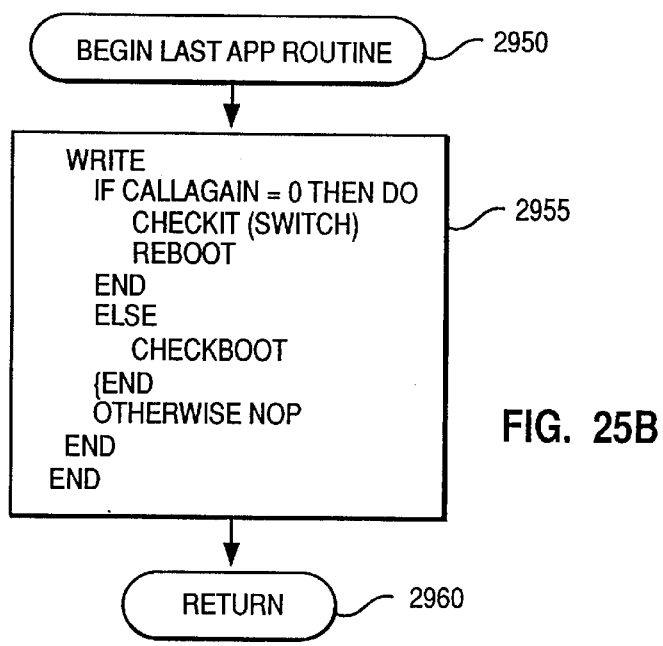

The LAST APP routine begins with step 2950 in FIG. 25B. This routine writes the REXX logic used to terminate the install section of the LCU command file. In step 2955, the REXX syntax is written as follows:

```
       If CALL_AGAIN = 0 then do
          CheckIt('SWITCH)
          call reboot
       end
       else
          call checkboot
       end
    otherwise nop
 end
end
```

This code will check if the LCU variable CALL-AGAIN is set, if it is not, the CheckIT routine will be called to switch to the next plan in the workstations queue (if there is one). The CALL-AGAIN variable is set to 1 if any of the programs in the current overall state return reboot-and-Callback return codes. If call-again is set to 1, the LCU procedure to reboot the workstation is called. The LAST APP routine then returns to the calling procedure.

Figure 25C:
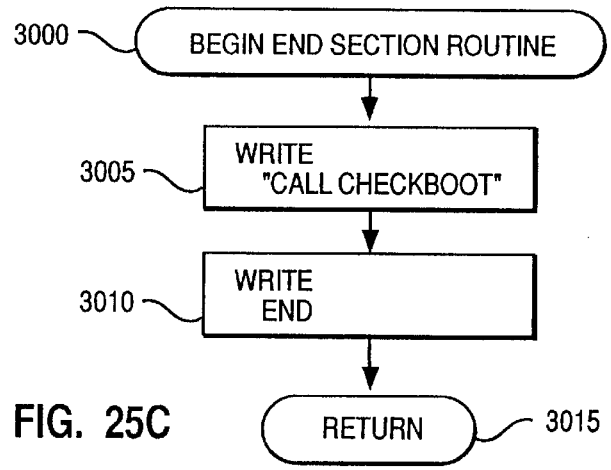

The END SECTION routine begins with step 3000 in FIG. 25C. This routine writes the REXX logic used to terminate a single overall-state in the LCU command file. In steps 3005 and 3010, the REXX syntax is written out as follows:

call checkboot
      end

This code calls the LCU procedure for conditional rebotting the workstation. The END SECTION routine then returns to the calling procedure.

Figure 26:
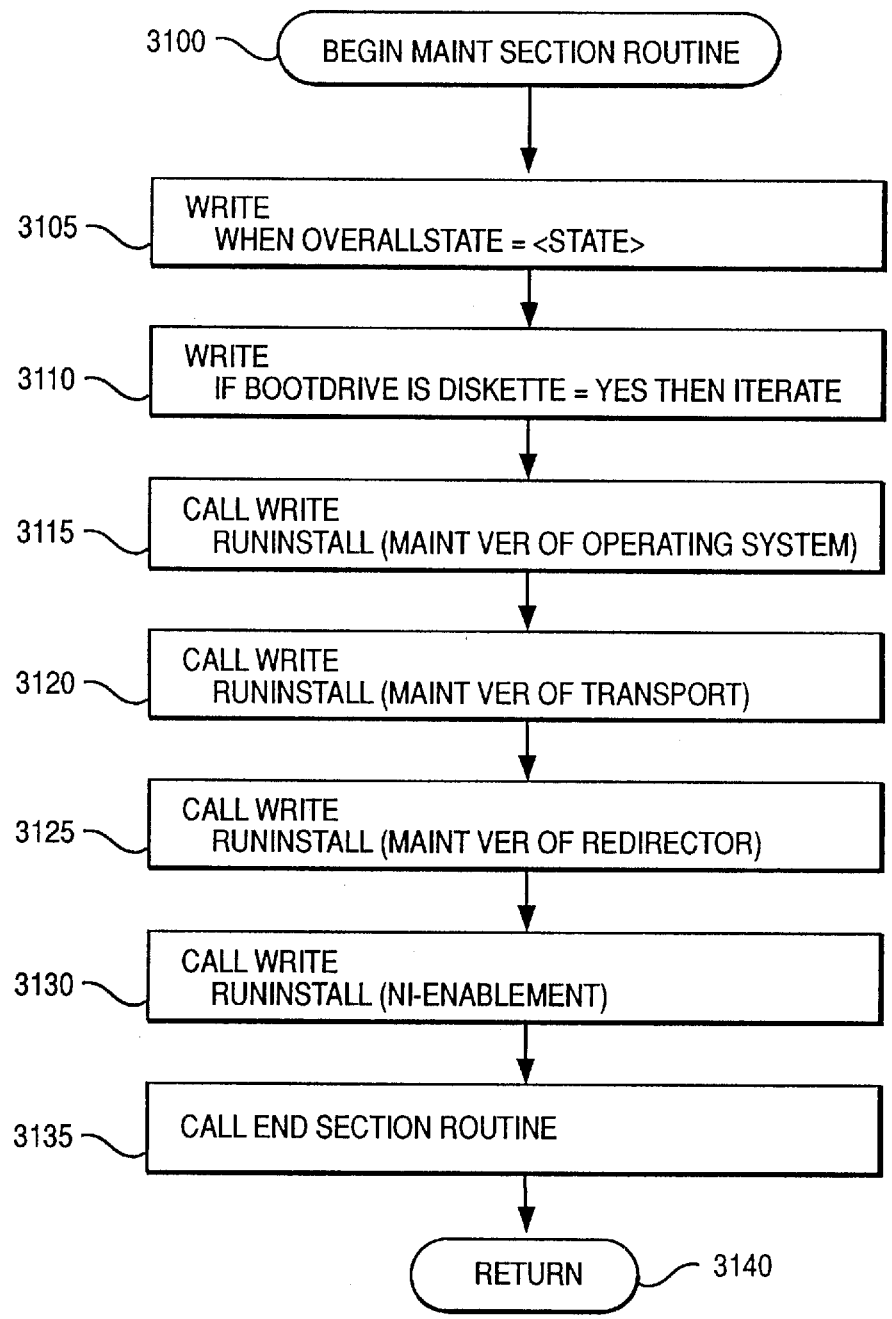
FIG. 26 illustrates the maintenance section process.

The MAINT SECTION routine begins with step 3100 in FIG. 26. This routine writes the REXX logic and RunInstall statements needed to install a maintenance system on the target workstation. In step 3105, the REXX syntax indicating the proper section of the select statement is written out. Then in step 3110, the syntax for checking if the boot drive is a diskette is written out. In step 3115, the WRITE RUNINSTALL routine is called for the maintenance version of the operating system defined in the plan. In step 3120, the WRITE RUNINSTALL routine is called for the maintenance version of the transport application defined in the plan. In step 3125, the WRITE RUNINSTALL routine is called for the redirector that is in the plan and in step 3130, the WRITE RUNINSTALL routine is called for the network installation enablement program. Then in step 3135, the END SECTION routine is called. The MAINT SECTION routine then returns to the calling procedure.

Figure 27:
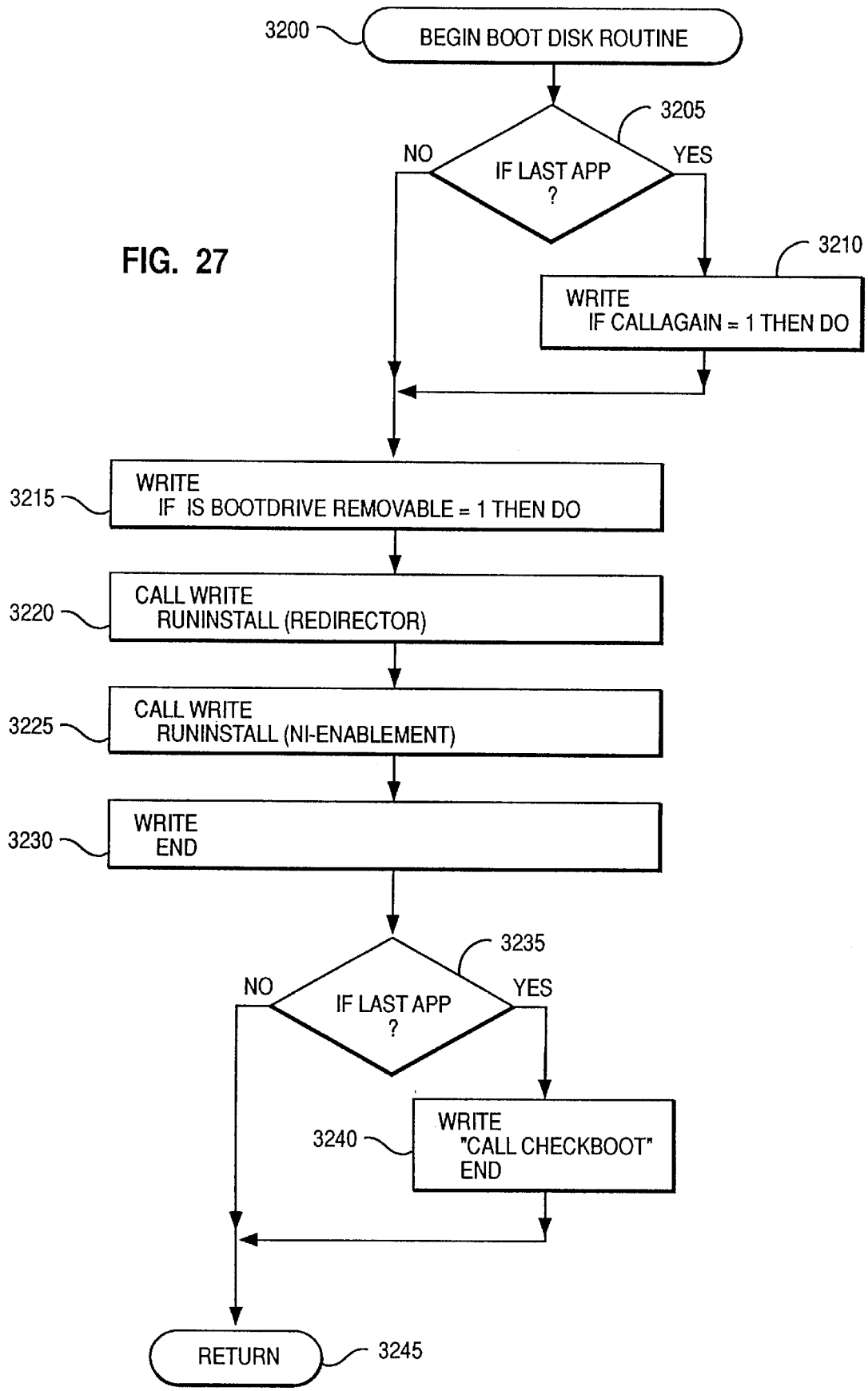
FIG. 27 shows the boot disk process.

The BOOT DISK routine begins with step 3200 in FIG. 27. This routine writes the REXX logic and runInstall statements needed to install the Network Installation Utility and required redirector to the target workstation's hardfile when the installation was started from boot diskettes. The first step is decision block 3205 that determines if this is the last application. If it is the last application, the REXX syntax is written out to the LCU command file as follows before proceeding to step 3215:

if CALL_AGAIN=1 then do

The Call-AGAIN variable is checked if this is the last application, because if this application is not requesting a call back, there is no need to put the call back utility on the hard file. This check in essence saves a reboot. If this is not the last application, processing continues with step 3215 where the syntax for checking if the boot drive is a diskette is written out. In step 3220, the WRITE RUNINSTALL routine is called for the redirector that is in the plan, then in step 3225, the WRITE RUNINSTALL routine is called for the network installation enablement program. End is written in step 3230 Processing continues to decision block 3235, where it checks if this is the last application. If it is not the last application, the BOOT DISK routine returns to the calling procedure, otherwise, the REXX syntax is written in step 3240 as follows before returning to the calling procedure:

call checkboot
end

This code calls the LCU procedure to conditionally reboot the machine based on the CID return codes from the programs previously installed in the current overall-state.

Figure 28:
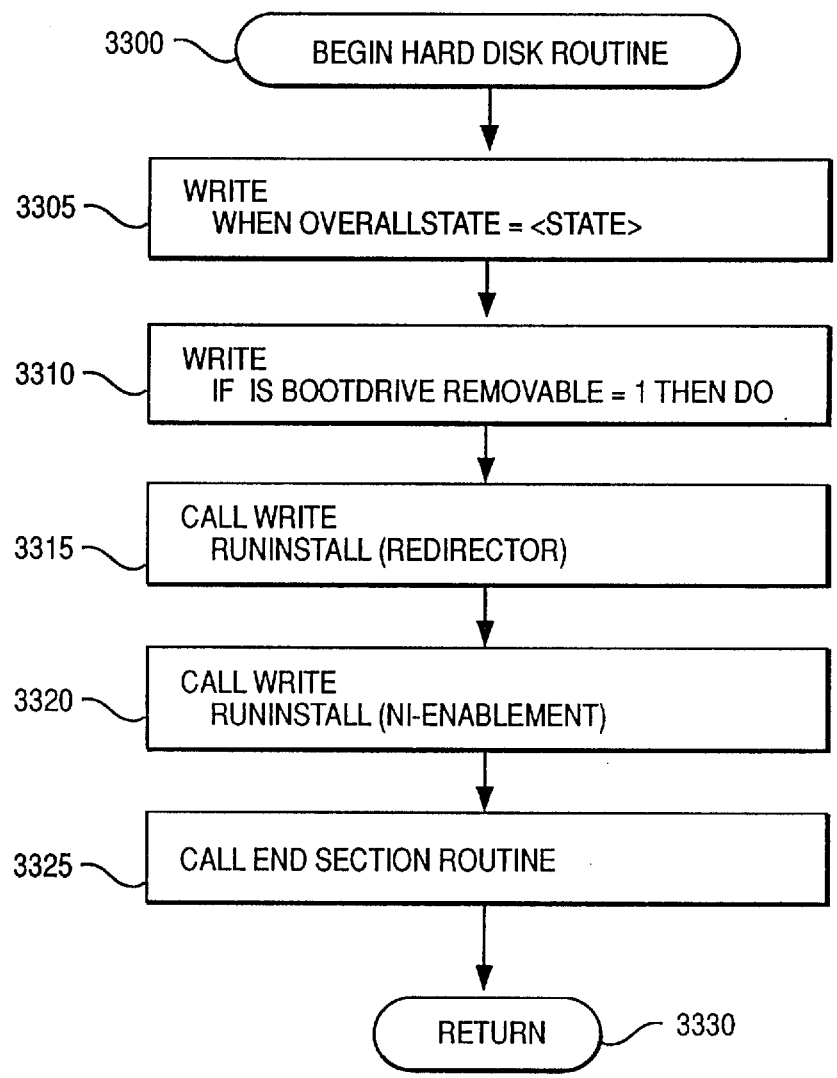
FIG. 28 depicts the hard disk process.

The HARD DISK routine begins with step 3300 in FIG. 28. This routine writes the REXX logic & RunInstall statements required to install the Network Installation Utility and required redirector to the target workstation's hard file when booted from boot diskettes when the application being installed requires PM. In step 3305, the REXX syntax indicating the proper section of the select statement is written out. Then, in step 3310, the syntax for checking if the boot drive is a fixed disk is written out to the LCU command file. In step 3315, the WRITE RUNINSTALL routine is called for the redirector that is in the plan. In step 3320, the WRITE RUNINSTALL routine is called for the network installation enablement program. Step 3325 calls the end section routine. The HARD DISK routine will then return to the calling procedure. After running through the WRITE INSTALL SECTION routine with a plan that will install a transport which does not require a maintenance system or Presentation Manager, an operating system service which requires a maintenance system, and an application requires presentation manager in order, one would end up with an install section that resembles the following:

```
Do forever
  Select
    when OVERALL_STATE = 0 then do
      if RunInstall(transport) == BAD_RC then
```

-continued

```
        call CheckIt('STOP')
      if IsBootDriveRemovable = 1 then do
        if RunInstall(redirector) == BAD_RC then
          call CheckIt('STOP')
        if RunInstall(ni_enable) == BAD_RC then
          call CheckIt('STOP')
        end
        call checkboot
      end
    when OVERALL_STATE = 1 then do
      if RunInstall(os_maint) == BAD_RC then
        call CheckIt('STOP')
      if RunInstall(xport_maint) == BAD_RC then
        call CheckIt('STOP')
      if RunInstall(redirector) == BAD_RC then
        call CheckIt('STOP')
      if RunInstall(ni_enable) == BAD_RC then
        call CheckIt('STOP')
      call checkboot
    end
    when OVERALL_STATE = 2 then do
      if RunInstall(os_service) == BAD_RC then
        call CheckIt('STOP')
      call checkboot
    end
    when OVERALL_STATE = 3 then do
    if RunInstall(app) == BAD_RC then
      call CheckIt('STOP')
    if CALL_AGAIN = 0 then do
      call CheckIt('SWITCH')
      call Reboot
    end
    else call checkboot
  end
  otherwise nop
end
```

Following is an example of how the files produced by the INSTALL COND SCRIPT GENERATION routine are used during an installation. NWICHECK is the program that controls the order of plan execution on the target workstations.

When NWICHECK first runs, it checks the queue file for the workstation. The current plan will be the first plan in the queue. This plan will not be removed from the queue at this time; this will be done after the plan is complete on the workstation. All references to PRE, POST, and LCU command files from this point will be for the current plan.

If the workstation was booted from diskette, NWICHECK will run the LCU command file for the workstation. If the workstation was booted from the hardfile, NWICHECK will run the PRE command file will install the Network Installation Utilities on the hardfile. When the system reboots, it will automatically start running the LCU command file.

When the LCU command file has completed running the installations programmed, it will call the CheckIt procedure with a SUCCESS or FAIL flag. The CheckIt procedure will in turn call NWICHECK again with the current plan name and the SUCCESS or FAIL flag. When NWICHECK is called with a plan name, it will first run the POST command file for the plan indicated- If NWICHECK was called with the FAIL flag, processing will then stop and the current plan will remain in the queue. This is done so that corrective action can be taken and the plan restarted on the workstation. If NWICHECK was called with the success flag, NWICHECK will remove the plan indicated from the queue. If there are no more elements in the queue, processing will stop, otherwise, NWICHECK will run the PRE command file for the first element in the queue and reboot the system. Processing will continue as previously described until there are no more elements in the queue or a plan fails.

Consider the following example. There are two workstations, Wk1 and Wk2, and three plans, plan1, plan2, and plan3. Plan1 will install an operating system, a transport, and a redirector. Plan2 will install application, and Plan3 will install application3. Workstation Wk1 will have Plan1 and Plan2 executed on it. Workstation Wk2 will have Plan2 and Plan3 executed on it. Workstation Wk1 will be started from boot diskette, Workstation Wk2 will be started from the hardfile.

Workstation Queue files for workstation 1 and 2:

```
Wk1
   Plan1
   Plan2
Wk2
   Plan2
   Plan3
```

Applications contained in Plan 1, 2, and 3:

```
Plan1
   installs operating system
   installs transport
   installs redirector
Plan2
   installs application 1
Plan3
   installs application 2
```

Processing for workstation Wk1

NWICHECK reads the wk1 queue and determines that Plan1 should be executed. It then determines that the workstation was booted from diskette and runs the wk1 LCU COMMAND FILE for Plan1. After the wk1 LCU COMMAND FILE installs the operating system, transport, and redirector, NWICHECK is recalled with Plan1 and SUCCESS as parameters. NWICHECK runs the wk1 POST COMMAND FILE for Plan1, then removes Plan1 from the wk1 queue. NWICHECK then determines that Plan2 should be executed and runs the wk1 PRE COMMAND FILE for Plan2 and reboots the system. After the wk1 LCU COMMAND FILE installs application 1, NWICHECK is recalled with Plan2 and SUCCESS as parameters. NWICHECK runs the wk1 POST COMMAND FILE for Plan2, then removes Plan2 from the wk1 queue. NWICHECK then determines that there are no more plans in the wk1 queue and processing is stopped.

Processing for workstation Wk2

NWICHECK reads the wk2 queue file and determines that Plan2 should be executed. It then determines that the workstation was booted from the hardfile and runs the wk2 PRE COMMAND FILE and reboots the system. After the wk2 LCU COMMAND FILE installs application 1, NWICHECK is recalled with Plan2 and SUCCESS as parameters. NWICHECK runs the wk2 POST COMMAND FILE for Plan2, then removes Plan2 from the wk2 queue. NWICHECK then determines that Plan3 should be executed and runs the wk2 PRE COMMAND FILE for Plan3 and reboots the system. After the wk2 LCU COMMAND FILE installs application 2, NWICHECK runs the wk2 POST COMMAND FILE for Plan3, then removes Plan3 from the wk2 queue. NWICHECK then determines that there are no more plans in the wk2 queue and processing is stopped.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for committing an installation plan object for installing applications in a network comprising:

prevalidating the installation plan object by examining child objects in the installation plan object and adding additional child objects to the installation plan object if required;

validating the installation plan object by examining data in the installation plan object and its child objects for errors in the data; and transforming the child objects in the installation plan object into data structures usable for a network installation engine which installs applications across a network according to the data structures, if the installation plan is successfully validated.

2. The method as recited in claim 1 wherein the installation plan object includes an application-in-plan object which represents an application program and a group-in-plan object which represents a group of workstations on which the application program is to be installed.

3. The method as recited in claim 2 wherein the installation plan object further comprises a response file object which contains data for the installation of the application and a customization file object which contains data to customize the response file object data for particular workstations.

4. The method as recited in claim 2 wherein the validation step further comprises checking file directories on a target workstation which are specified as data in the installation plan object to determine if the file directories are physically valid and accessible on the network, the target workstation one of the group of workstations on which the application is to be installed.

5. The method as recited in claim 2 wherein the validation step further comprises confirming existence of objects on a code server workstation necessary for the installation of the application on the group of workstations, the code server objects not child objects of the installation plan object.

6. The method as recited in claim 2 wherein the validation step further comprises:

determining that an application object represents an application which provides an update to a first application in the network; and confirming existence of a first application object which represents the first application in an applications container object.

7. The method as recited in claim 2 wherein the validation step further comprises confirming an operating system and its level of corrective service on a target workstation.

8. The method as recited in claim 3 wherein the installation plan object contains a plurality of application-in-plan objects and a plurality of corresponding response file objects respectively representing a plurality of applications to be installed and a corresponding response file and the transformation step further comprises applying the customization file object to the plurality of response file objects to customize the plurality of response file objects to particular workstations in the group of workstations.

9. The method as recited in claim 1 which further comprises the steps of:
   repeating the prevalidating, validating and transforming steps for a plurality of installation plan objects;
   queuing the plurality of installation plan objects in a workstation queue for each workstation.

10. A system for committing an installation plan object for installing applications in a network comprising:
    means for prevalidating the installation plan object by examining child objects in the installation plan object and adding additional child objects to the installation plan object if required;
    means for validating the installation plan object by examining data in the installation plan object and its child objects for errors in the data; and
    means for transforming the child objects in the installation plan object into data structures usable for a network installation engine which installs applications across a network according to the data structures, if the installation plan is successfully validated.

11. The system as recited in claim 10 wherein the installation plan object includes an application-in-plan object which represents an application program and a group-in-plan object which represents a group of workstations on which the application program is to be installed.

12. The system as recited in claim 11 wherein the installation plan object further comprises a response file object which contains data for the installation of the application and a customization file object which contains data to customize the response file object data for particular workstations.

13. The system as recited in claim 11 wherein the validation means further comprises means for checking file directories on a target workstation which are specified as data in the installation plan object to determine if the file directories are physically valid and accessible on the network, the target workstation one of the group of workstations on which the application is to be installed.

14. The system as recited in claim 11 wherein the validation means further comprises means for confirming existence of objects on a code server workstation necessary for the installation of the application on the group of workstations, the code server objects not child objects of the installation plan object.

15. The system as recited in claim 11 wherein the validation means further comprises:
    means for determining that an application object represents an application which provides an update to a first application in the network; and
    means for confirming existence of a first application object which represents the first application in an applications container object.

16. The system as recited in claim 12 wherein the installation plan object contains a plurality of application-in-plan objects and a plurality of corresponding response file objects respectively representing a plurality of applications to be installed and a corresponding response file and the transformation step further comprises applying the customization file object to the plurality of response file objects to customize the plurality of response file objects to particular workstations in the group of workstations.

17. The system as recited in claim 10 which further comprises:
    means for repeating the prevalidating, validating and transforming steps for a plurality of installation plan objects;
    means for queuing the plurality of installation plan objects in a workstation queue for each workstation.

18. A computer program product in a computer readable memory for committing an installation plan object for installing applications in a network comprising:
    means for prevalidating the installation plan object by examining child objects in the installation plan object and adding additional child objects to the installation plan object if required;
    means for validating the installation plan object by examining data in the installation plan object and its child objects for errors in the data; and
    means for transforming the child objects in the installation plan object into data structures usable for a network installation engine which installs applications across a network according to the data structures, if the installation plan is successfully validated,
    the means activated when the computer memory is coupled to and accessed by a computer system.

19. The product as recited in claim 18 wherein the installation plan object includes an application-in-plan object which represents an application program and a group-in-plan object which represents a group of workstations on which the application program is to be installed.

20. The product as recited in claim 19 wherein the installation plan object further comprises a response file object which contains data for the installation of the application and a customization file object which contains data to customize the response file object data for particular workstations.

21. The object as recited in claim 19 wherein the validation means further comprises means for checking file directories on a target workstation which are specified as data in the installation plan object to determine if the file directories are physically valid and accessible on the network, the target workstation one of the group of workstations on which the application is to be installed.

22. The product as recited in claim 19 wherein the validation means further comprises means for confirming existence of objects on a code server workstation necessary for the installation of the application on the group of workstations, the code server objects not child objects of the installation plan object.

23. The product as recited in claim 19 wherein the validation means further comprises:
    means for determining that an application object represents an application which provides an update to a first application in the network; and
    means for confirming existence of a first application object which represents the first application in an applications container object.

24. The product as recited in claim 20 wherein the installation plan object contains a plurality of application-in-plan objects and a plurality of corresponding response file objects respectively representing a plurality of applications to be installed and a corresponding response file and the transformation step further comprises applying the customization file object to the plurality of response file objects to customize the plurality of response file objects to particular workstations in the group of workstations.

25. The product as recited in claim 18 which further comprises:
    means for repeating the prevalidating, validating and transforming steps for a plurality of installation plan objects;

means for queuing the plurality of installation plan objects in a workstation queue for each workstation.

* * * * *